United States Patent
Tamasanis et al.

(10) Patent No.: US 10,095,046 B2
(45) Date of Patent: *Oct. 9, 2018

(54) AUTOMATED UV CALIBRATION, MOTORIZED OPTICAL TARGET AND AUTOMATIC SURFACE FINDER FOR OPTICAL ALIGNMENT AND ASSEMBLY ROBOT

(71) Applicant: Automation Engineering, Inc., Wilmington, MA (US)

(72) Inventors: Dan Tamasanis, Andover, MA (US); Jonathan P. Berg, Pepperell, MA (US); John Alden, Bedford, NH (US)

(73) Assignee: Automation Engineering, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,395

(22) Filed: Sep. 18, 2017

(65) Prior Publication Data

US 2018/0004004 A1    Jan. 4, 2018

Related U.S. Application Data

(63) Continuation of application No. 14/613,171, filed on Feb. 3, 2015, now Pat. No. 9,766,473.
(Continued)

(51) Int. Cl.
*G02B 27/62* (2006.01)
*G05B 19/401* (2006.01)
(Continued)

(52) U.S. Cl.
CPC ............ *G02B 27/62* (2013.01); *B25J 9/1687* (2013.01); *G01B 5/14* (2013.01); *G05B 19/401* (2013.01);
(Continued)

(58) Field of Classification Search
CPC .................. G02B 27/62; G05B 19/401; G05B 2219/49001; G05B 2219/45064;
(Continued)

(56) References Cited

U.S. PATENT DOCUMENTS

| 5,926,594 A | 7/1999 | Song et al. |
| 6,678,061 B2 | 1/2004 | Kilthau et al. |

(Continued)

FOREIGN PATENT DOCUMENTS

| GB | 2 420 239 A | 5/2006 |
| WO | WO 96/07118 A2 | 3/1996 |

OTHER PUBLICATIONS

Aptina Imaging, "1/2.5-Inch 5Mp CMOS Digital Image Sensor," Aptina Imaging, Mar. 22, 2011, pp. 1-60.
(Continued)

*Primary Examiner* — Jaime Figueroa
(74) *Attorney, Agent, or Firm* — Sunstein Kann Murphy & Timbers LLP

(57) ABSTRACT

In an optical components automatic alignment robot, a motorized target moves closer or further from a digital camera being tested or assembled. A light sensor is used to automatically calibrate an ultraviolet (UV) or other light source used for curing adhesive. An automatic surface finder is used to accurately and repeatably find a surface on which adhesive is to be dispensed.

22 Claims, 21 Drawing Sheets

Related U.S. Application Data

(60) Provisional application No. 61/935,078, filed on Feb. 3, 2014.

(51) Int. Cl.
*B25J 9/16* (2006.01)
*G01B 5/14* (2006.01)

(52) U.S. Cl.
CPC .............. *G05B 2219/37618* (2013.01); *G05B 2219/45064* (2013.01); *G05B 2219/49001* (2013.01); *Y10S 901/44* (2013.01)

(58) Field of Classification Search
CPC ......... G05B 2219/37618; B25J 9/1687; G01B 5/14; Y10S 901/44
USPC .................................................. 700/245, 259
See application file for complete search history.

(56) References Cited

U.S. PATENT DOCUMENTS

| | | |
|---|---|---|
| 7,015,418 B2 | 3/2006 | Cahill et al. |
| RE41,924 E | 11/2010 | Nemets et al. |
| 8,063,975 B2 | 11/2011 | Butterfield et al. |
| 9,766,473 B1 | 9/2017 | Tamasanis et al. |
| 2005/0007485 A1 | 1/2005 | Vook et al. |
| 2006/0000964 A1 | 1/2006 | Ye et al. |
| 2006/0103754 A1 | 5/2006 | Wenstrand et al. |
| 2010/0002126 A1 | 1/2010 | Wenstrand et al. |
| 2012/0019940 A1 | 1/2012 | Lu et al. |
| 2013/0047396 A1 | 2/2013 | Au et al. |
| 2013/0192391 A1 | 8/2013 | Bruehwiler et al. |
| 2013/0274923 A1 | 10/2013 | By |
| 2014/0183246 A1 | 7/2014 | Saitou et al. |

OTHER PUBLICATIONS

Automation Engineering Incorporated, "Automation speeds precision products and rapid model changes," A discussion with Andre by of Automation Engineering Incorporated, Vision Systems Design, vol. 9, Issue 7, Jul. 1, 2004, 3 pages.

Automation Engineering Incorporated, "Photonics Module Align Assembly & Test Flexible Automation Platform Cuts Time to Market," Automation Engineering Incorporated, http://www.aeiboston.com/pr012110.htm, Jan. 21, 2010, 1 page.

Automation Engineering Incorporated, "Camera Module Alignment Assembly & Test Automation Cuts Time to Market for Ultra-Small Format Mobile Phone Cameras," Automation Engineering Incorporated, http://www.aeiboston.com/pr021110.htm, Feb. 11, 2010, 1 page.

Automation Engineering Incorporated, "AEi Develops Modular Design for Camera Module Alignment Assembly & Test Automation Platform," Automation Engineering Incorporated, http://www.aeiboston.com/pr101811.htm, Oct. 4, 2011, 1 page.

By, "Aligning Optics," Vision Systems Design, vol. 16, Issue 4, Apr. 1, 2011, 7 pages.

International Searching Authority, International Search Report—International Application No. PCT/US2013/036355, dated Jul. 25, 2013, together with the Written Opinion of the International Searching Authority, 10 pages.

Kasalis, "Adhesive Attach of Camera Module Lenses," http://www.kasalis.com/adhesive_attach.html, Kasalis 2012, no later than Aug. 30, 2012, 1 page.

Kasalis, "Active Alignment of Camera Module Components in Six Degrees of Freedom—The Perfect, Theoretical, Camera Only Exists on Paper," http://www.kasalis.com/active_alignment.html, Kasalis, no later than Aug. 30, 2012, 2 pages.

Kasalis, "Active Alignment of Camera Module Components in Six Degrees of Freedom—Real World Problem #1: Lens and Barrel Tolerance," http://www.kasalis.com/active_alignment.html, Kasalis, no later than Aug. 30, 2012, 2 pages.

Kasalis, "Active Alignment of Camera Module Components in Six Degrees of Freedom—Real World Problems #2: Lens Barrel and Sensor Tolerances," http://www.kasalis.com/active alignment.html, Kasalis, no later than Aug. 30, 2012, 2 pages.

Kasalis, "Active Alignment of Camera Module Components in Six Degrees of Freedom—Solution: Adaptive Active Alignment," http://www.kasalis.com/active_alignment.html, Kasalis, no later than Aug. 30, 2012, 2 pages.

Roe, et al., "Vision system assists camera-module alignment," Vision Systems Design, vol. 12, Issue 4, Apr. 1, 2007, 6 pages.

Shakespeare, et al., "Optical Alignment in Optoelectronic Components," International Microelectronics and Packaging Society, Advancing Microelectronics, vol. 29, No. 1, Jan./Feb. 2002, 9 pages.

United States Patent and Trademark Office, Office Action dated Jan. 16, 2015 pertaining to U.S. Appl. No. 13/861,844, 10 pages.

Wikipedia, "Interpolation," Wikipedia, Mar. 26, 2012, 6 pages.

AUTOMATED UV CALIBRATION, MOTORIZED OPTICAL TARGET AND AUTOMATIC SURFACE FINDER FOR OPTICAL ALIGNMENT AND ASSEMBLY ROBOT

CROSS REFERENCE TO RELATED APPLICATIONS

This application is a continuation of U.S. patent application Ser. No. 14/613,171, filed Feb. 3, 2015, titled "Automated UV Calibration, Motorized Optical Target and Automatic Surface Finder for Optical Alignment and Assembly Robot," now U.S. Pat. No. 9,766,473, issued Sep. 19, 2017, which claims the benefit of U.S. Provisional Patent Application No. 61/935,078, filed Feb. 3, 2014, titled "Automated UV Calibration, Motorized Optical Target and Automatic Surface Finder for Optical Alignment and Assembly Robot," the entire contents of each of which are hereby incorporated by reference herein, for all purposes.

TECHNICAL FIELD

The present invention relates to automatic robotic alignment of optical components during manufacture or testing and, more particularly, to apparatus and methods for automatically calibrating an ultraviolet (UV) source used for curing adhesive, a motorized optical target used for aligning optical components and an automatic surface finder used to find a surface on which adhesive is to be dispensed.

BACKGROUND ART

Robots are used in many precision manufacturing processes. For example, robots are used to precisely align lenses before digital camera sensors, such as in the manufacture of cell phones and backup cameras for automobiles. In other examples, robots align ends of optical fibers before lasers or light sensors in the manufacture of telecommunication and computer network equipment. Many of the lenses are quite small, on the order of several millimeters in diameter, and must, therefore, be positioned with high precision, often on the order of about ±5 µm or less, relative to the sensors or lasers.

To keep costs down, less-than-precise methods are often used to manufacture optical elements for the lenses and to mount the optical elements in lens housings. Consequently, the optical elements and lenses are often not uniform, from piece to piece. That is, dimensions and symmetries of the components often vary from lens to lens or other optical components, resulting in variations in focal length and orientation of the optical axes of the components.

To compensate for such variations, several known methods are used to custom align each lens to its corresponding image sensor. One method involves mounting a finely threaded bracket to the sensor and mounting a group of optical elements in a complementarily threaded barrel. The distance between the optical elements and the sensor can then be adjusted as the lens barrel is threaded into the bracket. Once the optical elements are disposed a desired distance from the sensor, the barrel may be fixed, relative to the bracket, to prevent further rotation. Unfortunately, this method allows adjustment of only the distance between the optical elements and the sensor along the z axis (the optical axis). Thus, this method is referred to as aligning with only one degree of freedom. Such an alignment methodology cannot compensate for all potential asymmetries in the optical elements or imperfect alignment of the optical elements within the barrel.

A more sophisticated method, developed by Automation Engineering, Inc. ("AEi"), Wilmington, Mass., involves attaching the lens barrel (which in this case does not require threads) to the image sensor or its substrate or a camera housing that includes the image sensor by an adhesive with camera module or other opto-electronic product component geometries such that more than one degree of freedom alignment is possible. The position of the lens barrel, relative to the image sensor, is adjusted in free space by a robot, which then holds the lens barrel in position until the adhesive cures sufficiently to prevent objectionable creep once the robot releases the lens barrel. Using this method, the position of the lens may be adjusted along all three linear axes (x, y and z), and pitch (rotation about the x axis) and roll (rotation about the y axis) of the lens may be adjusted, to achieve a lens position and orientation, relative to the sensor, that compensates for imperfections in the optical elements and in the way the optical elements are mounted within the barrel with respect to the position of the image sensor. This method is referred to as aligning about five degrees of freedom.

A refinement of this method, also develop by Automation Engineering, Inc., involves the robot rotating the lens about the optical axis of the lens or about the z axis to optimize image quality, to compensate for angular lens asymmetries in this axis. Note that alignment about the optical or z axis is generally not possible with the threaded barrel alignment method, because it is highly unlikely to simultaneously achieve both a desired lens-to-sensor spacing (by threading the barrel in or out) and a desired lens rotation angle (by rotating the barrel). Adding this refinement to the 5-degree of freedom alignment method provides a 6-degree of freedom alignment.

"Passive alignment" involves aligning components to each other based on design specifications of the components, using precision mechanical fixtures, tooling, physical characteristics (fiducials) on surfaces of components and the like. For example, a target design focal length of a lens may be used to position the lens, relative to a sensor. However, passive alignment assumes components perfectly conform to their theoretical design specifications. This, of course, does not typically occur with real-world products. Thus, passive alignment methods are typically unable to compensate adequately for piece-to-piece variations in components, such as lenses, unless each piece is individually tested to ascertain its actual specifications.

In contrast, "active alignment" involves measuring one or more key performance attributes of a combination of components during manufacture and using the measured attributes in a feedback loop to control the manufacture. For example, a visual target, such as a test pattern, may be disposed within a viewing angle of a lens-and-image-sensor combination while a robot steps the lens through a series of discrete positions (ex., along the x, y and z axes) and orientations (ex., tips, tilts and rotations about the z axis). A computer analyzes image data from the sensor at each step and, based on this analysis, the computer controls the robot to position and orient the lens for optimum image quality. The lens is then fixed in position, relative to the sensor, such as by an adhesive. Active alignment is, therefore, able to compensate for piece to piece variations in components.

While active alignment requires hardware and software not necessary for passive alignment, active alignment may not necessarily be more expensive than passive alignment.

For example, active alignment can often be performed using less accurate and, therefore, less expensive fixturing and motion stages in a given manufacturing station. Active alignment can also provide higher manufacturing yield, which results in reduced manufacturing costs. However, stepping through all the test positions and orientations takes time. Manufacturers constantly seek to shorten cycle times and, thus, speed up manufacturing processes.

SUMMARY OF EMBODIMENTS

An embodiment of the present invention provides a system for actively aligning a lens to a digital camera that has an optical axis. The system includes a target, a robot, a drive assembly, a measurement controller and an alignment processor. The robot is configured to grasp the lens and orient the lens intermediate (between) the target and the digital camera, so as to image the target onto the digital camera. The drive assembly is mechanically coupled to the target to move the target along an axis parallel to the optical axis of the digital camera, thereby selectively adjusting spacing between the target and the digital camera. The motion controller is configured to cause the robot to continuously scan the lens along a trajectory from a starting location to an ending location. The motion controller is configured, while the robot continuously scans the lens from the starting location to the ending location, to store a plurality of time spaced-apart positions of the lens. The measurement controller is configured, while the robot continuously scans the lens from the starting location to the ending location, to acquire a plurality of time spaced-apart alignment data items. Each alignment data item of the plurality of time spaced-apart alignment data items results from an optical signal, from the target, that passed through the lens and was received by the digital camera. Each alignment data item of the plurality of time spaced-apart alignment data items contains data indicative of a degree of optical alignment between the lens and the digital camera. The alignment processor is configured to estimate a desired alignment position, based at least in part on the plurality of time spaced-apart alignment data items and the plurality of time spaced-apart positions of the first optical element. The alignment processor is configured to cause the robot to move the lens to the desired alignment position.

The drive assembly may include a hand crank. The drive assembly may include a motor. The measurement controller may be configured to control operation of the motor.

The system may also include a linear encoder and a corresponding reader configured to encode position of the target along the axis parallel to the optical axis. The measurement controller may be configured to receive, from the reader, information about the position of the target along the axis parallel to the optical axis.

The system may also include a relay optical element disposed intermediate the target and the digital camera.

Another embodiment of the present invention provides a system for aligning a lens to a digital camera. The system includes a robot, an active alignment controller, a light source, and a curing light. The robot is configured to grasp the lens. The active alignment controller is configured to cause the robot to scan the lens along a trajectory, relative to the digital camera. The active alignment controller is configured to acquire a plurality of time spaced-apart alignment data items along the trajectory. The active alignment controller is configured, based on the alignment data items, to estimate a desired alignment position for the lens. The active alignment controller is configured to cause the robot to move the lens to the desired alignment position. The light source radiates light of a wavelength selected to facilitate curing an adhesive to bond the lens to the digital camera in the desired alignment position. The curing light calibrator includes a light sensor sensitive to the selected wavelength. The curing light calibrator includes an indexer configured to position the light sensor, in one mode, proximate the light source and, in another mode, distant from the light source. The active alignment controller is further configured to receive data from the light sensor indicating intensity of the light source.

The digital camera may have an optical axis. The indexer may be configured to translate the light sensor along an axis parallel to the optical axis of the digital camera.

The indexer may be configured to rotate the light sensor about an axis parallel to the optical axis of the digital camera.

Yet another embodiment of the present invention provides a surface finder. The surface finder includes a housing, a sensor and an elongated probe. The housing has a longitudinal axis. The sensor is disposed a fixed location, relative to the housing. The elongated probe has a longitudinal axis. The probe is disposed and configured to translate along the longitudinal axis of the housing, so as to extend at most partially from, and to retract at least partially into, the housing. A portion of the probe is detectable by the sensor. The housing and the sensor are configured such that the probe can retract into the housing a distance sufficient to prevent detection of the portion of the probe by the sensor. The housing and the sensor are configured such that the probe can extend from the housing a distance sufficient to enable detection of the portion of the probe by the sensor.

The sensor may include a proximity sensor.

An embodiment of the present invention provides a method for finding a surface. The method includes extending a probe from a housing until a sensor detects the probe. The housing is lowered, relative to the surface, until a distal end of the probe contacts the surface and subsequently the sensor ceases detecting the probe.

Another embodiment of the present invention provides a method for repeatably locating a tool a predetermined distance from surfaces of a plurality of workpieces. The method includes extending a probe from a housing until a sensor detects the probe. The tool is lowered, relative to a surface of a first workpiece, in unison with the housing until a distal end of the probe contacts the surface of the first workpiece and subsequently the sensor ceases detecting the probe. The method then includes ceasing lowering the tool and raising the tool. The probe is extended from the housing again until the sensor detects the probe. The tool is lowered, relative to a surface of a second workpiece, in unison with the housing again until the distal end of the probe contacts the surface of the second workpiece and subsequently the sensor ceases detecting the probe. The method then includes ceasing lowering the tool.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
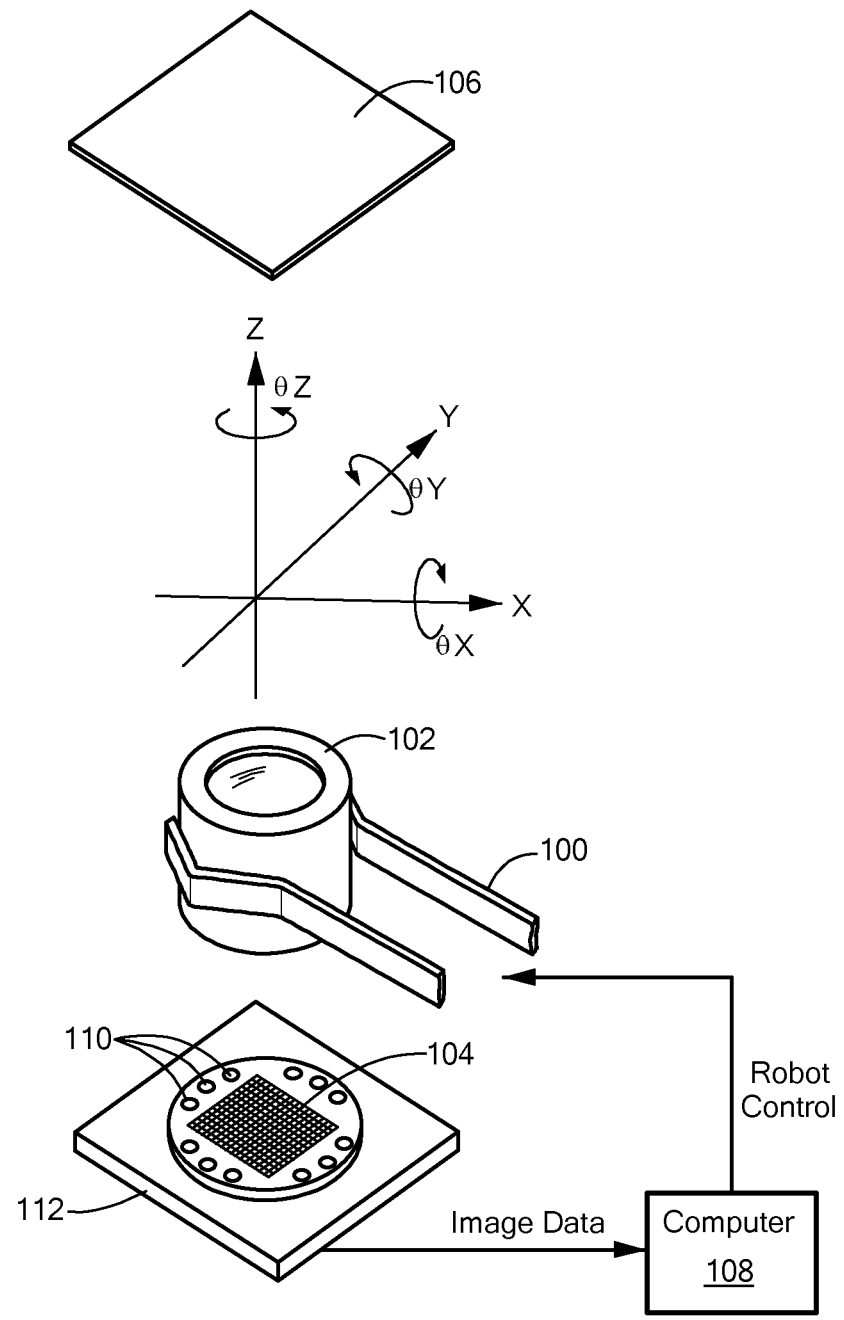
FIG. 1 is a perspective schematic illustration of a robotic active alignment system, according to the prior art.

In accordance with embodiments of the present invention, methods and apparatus are disclosed for automatically calibrating an ultraviolet (UV) source used for curing adhesive, a motorized optical target used for aligning optical components and an automatic surface finder used to find a surface on which adhesive is to be dispensed. These methods and apparatus may be used in equipment that actively aligns a first optical element, such as a lens, to a second optical element, such as an image sensor, using a continuous scan.

During a scan, embodiments of the present invention collect timed position information about the scanned optical element, and then estimate a relationship between position of the scanned optical element and time, such as by fitting a curve to a set of position-time pairs. This relationship can then be used to estimate locations of the scanned optical element at times when image data or other alignment quality-indicating data samples are acquired. From this alignment quality versus location data, an optimum alignment position can be determined, and the scanned optical element can then be positioned at the determined alignment position.

Some embodiments utilize a synchronization signal from an image sensor circuit to trigger recording position information about the scanned optical element. In some embodiments, in which the image sensor circuit does not generate a synchronization signal, a synchronization signal is synthesized by an image capture component.

As alluded to above, an established approach to align objects during assembly or test operations involves use of active feedback or measurements that correlate directly to a degree (quality) of alignment between the objects. For example, a lens or other optical object can be optimally aligned to a light emitting diode to produce a highest focus beam by using a beam profiling sensor to detect when beam power density from the diode through the lens is highest. In another example, schematically illustrated in FIG. 1, an automated robot (represented by a gripper 100) is used to optimally align a lens 102 before a digital camera sensor 104 during assembly of the two objects 102 and 104 by evaluating focus sharpness of images taken by the sensor 104 while it is powered up and pointed towards an alignment target 106, while positioning the lens 102 at successive locations along the x, y and z axes and successive orientations about the x, y and z axes, with respect to the sensor 104. Pitch (about the x axis), roll (about the y axis) and yaw rotation about the z axis (the optical axis) are indicated by angles $\theta x$, $\theta y$ and $\theta z$, respectively.

Figure 2:
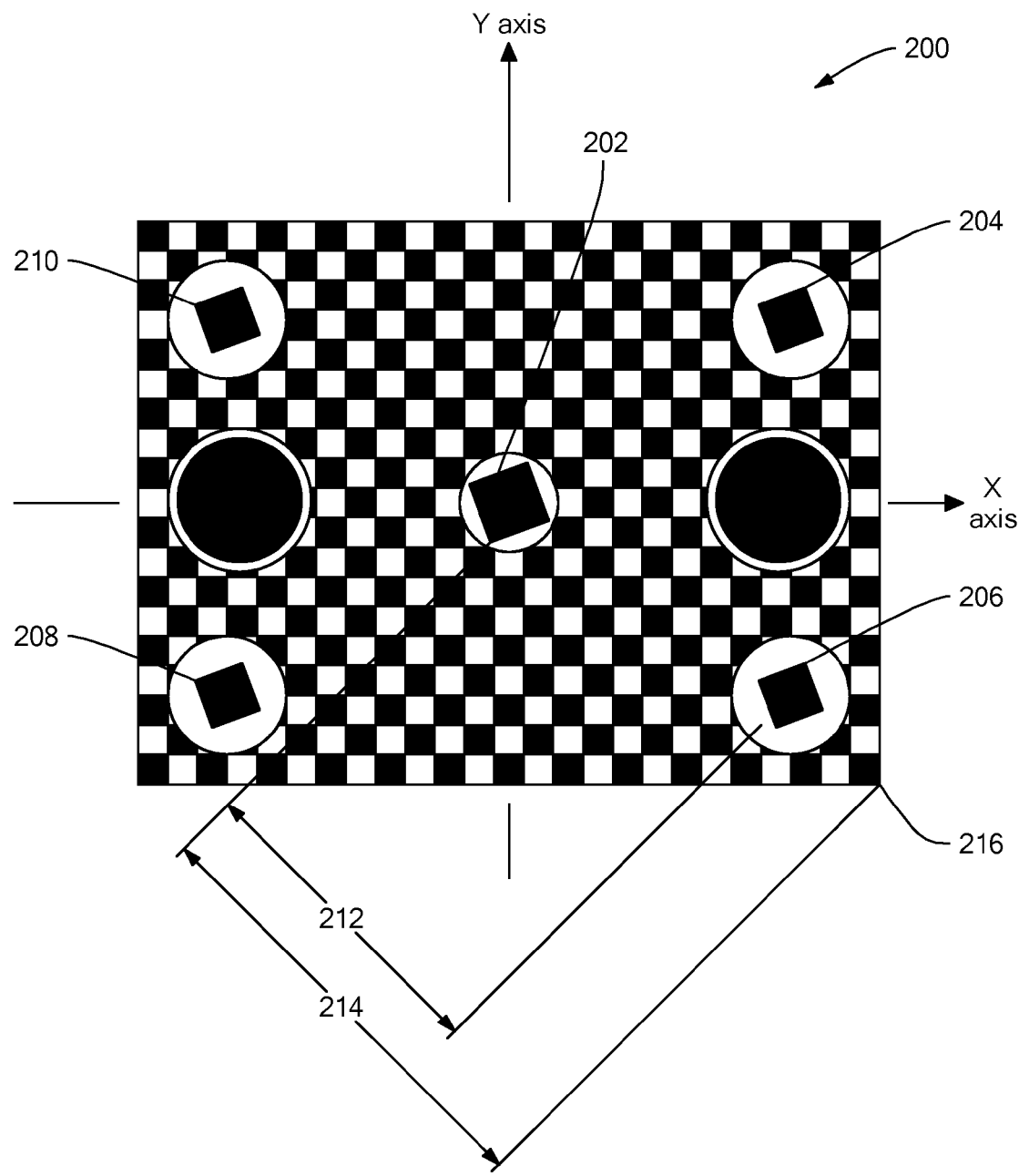
FIG. 2 is an illustration of an alignment target of FIG. 1, according to the prior art.

FIG. 2 illustrates an exemplary alignment target 200. The target 200 has high-contrast features at its center 202 and corners 204, 206, 208 and 210, as seen by the sensor 104. In the exemplary target shown in FIG. 2, each high-contrast feature includes a slightly rotated black square on a white background and other high contrast elements, such as a checkerboard pattern or line pairs. Thus, the position and orientation of the lens 102, with respect to the sensor 104, that have best image focus quality, as imaged by the sensor 104, will be where the images have highest observed image intensity gradient or contrast across the high contrast variations distributed spatially across the target 200. In other words, as the lens 102 is stepped through its various positions and orientations, when the highest contrast or intensity gradient is detected in the image, the lens 102 is positioned to provide best focus.

Motorized Target

Figure 12:
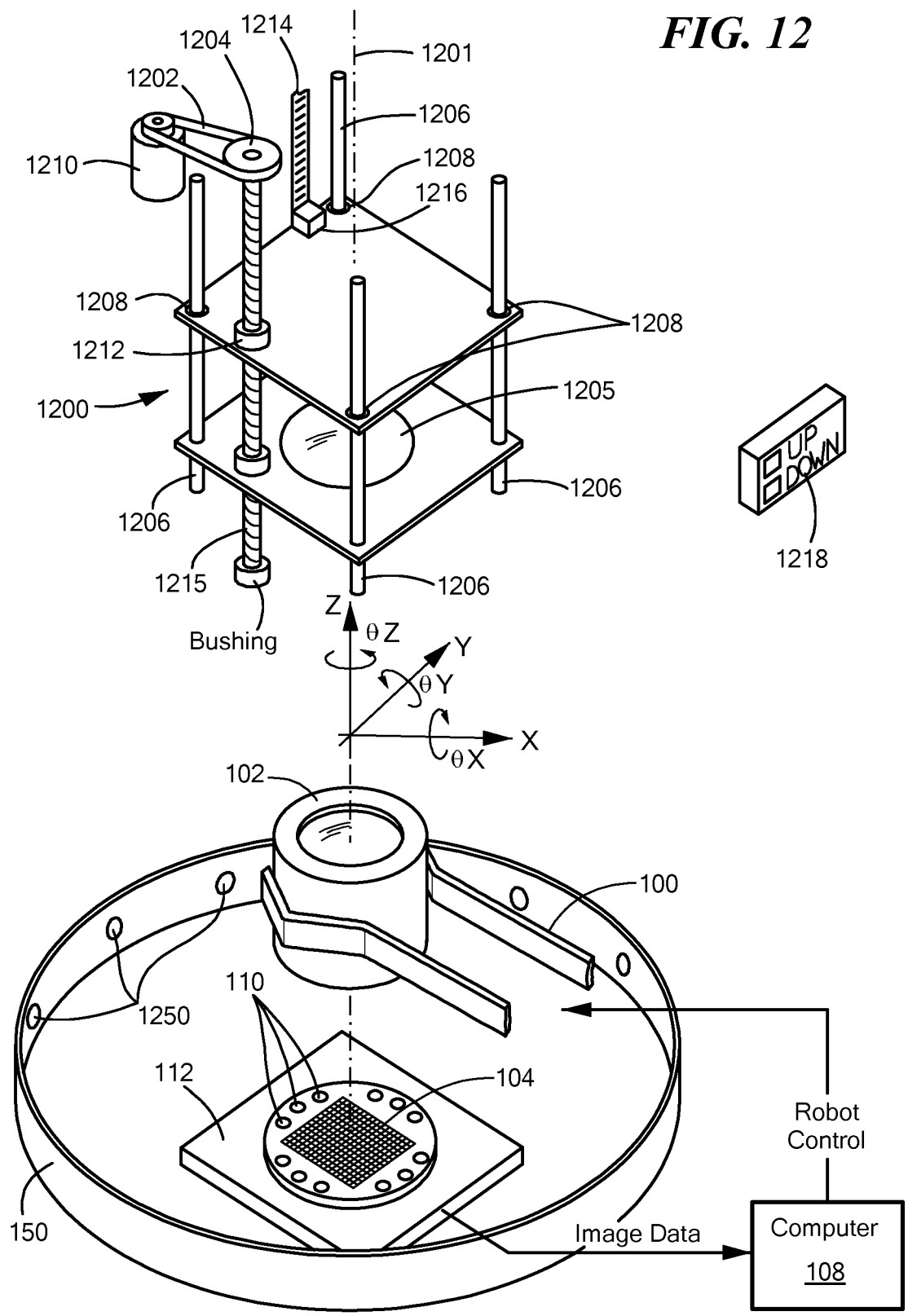
FIG. 12 is a perspective schematic illustration of a robotic active alignment system, including a motorized target, according to an embodiment of the present invention.
Figure 13:
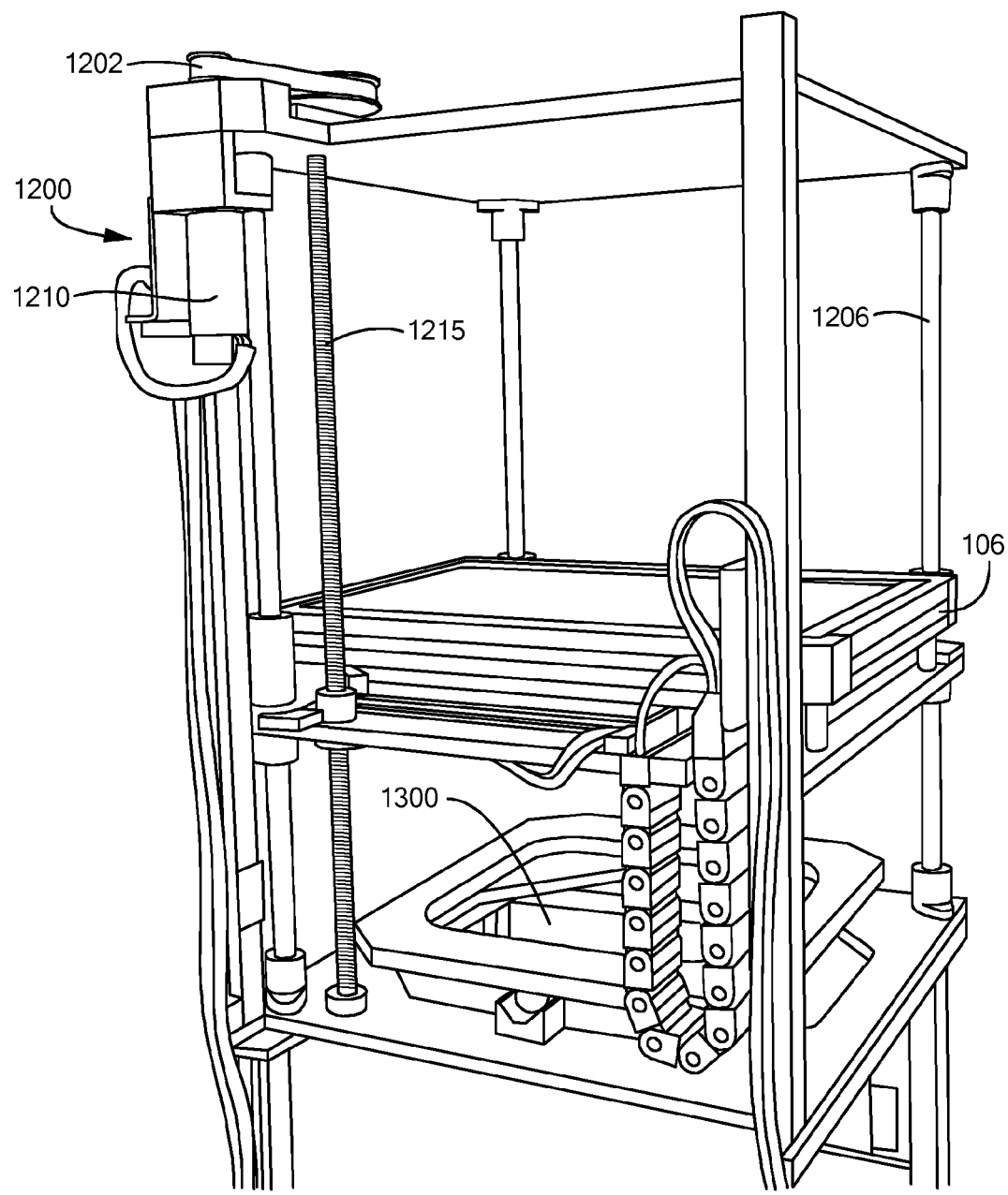
FIG. 13 is an illustration of the motorized target of FIG. 12.
Figure 14:
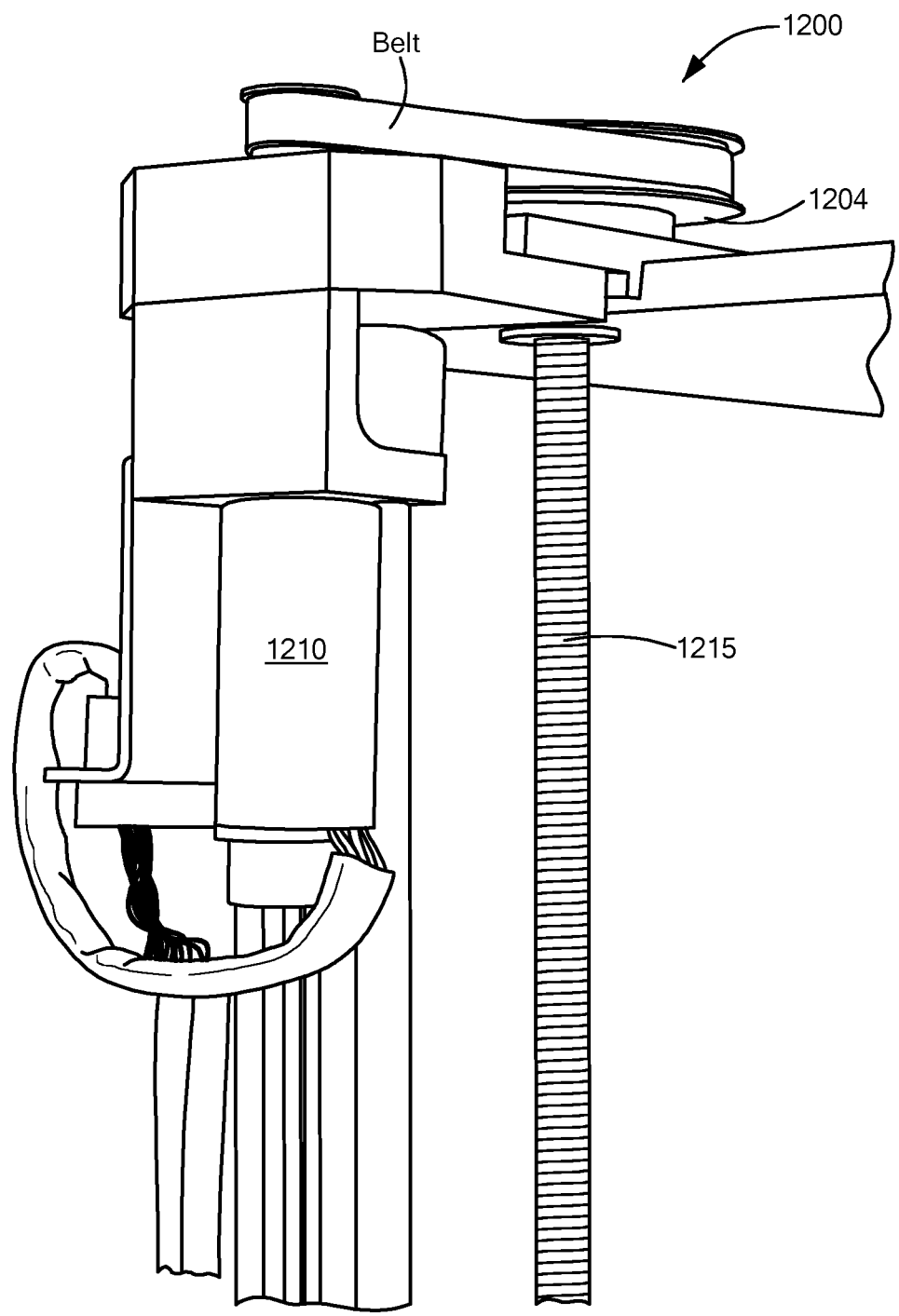
FIG. 14 is a close-up view of a portion of FIG. 13.
Figure 15:
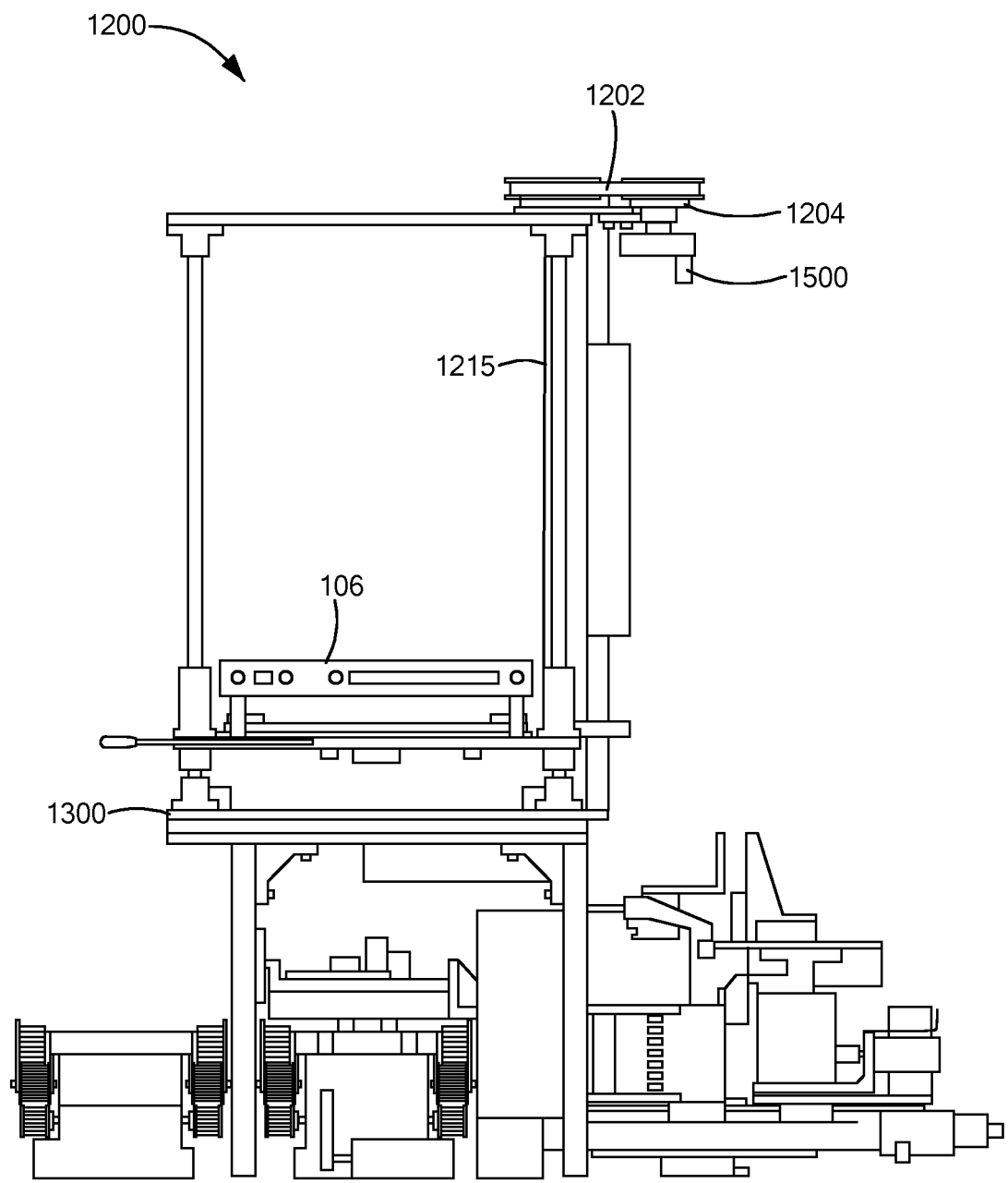
FIGS. 15 and 16 are computer-aided design (CAD) drawings of a hand-cranked movable target, similar to the motorized target of FIGS. 12-14, according to another embodiment of the present invention.
Figure 16:
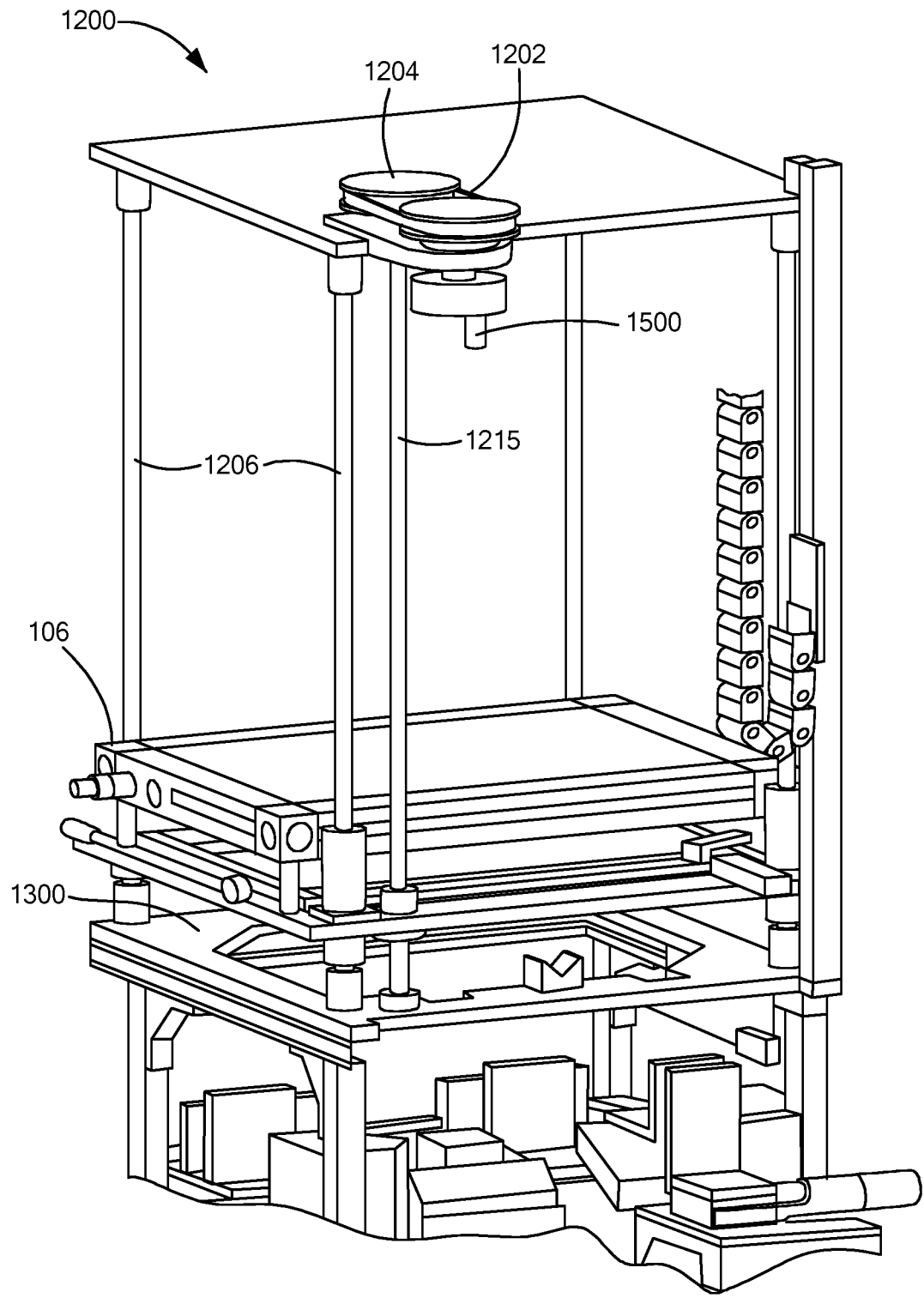

In some embodiments, the target 106 (FIG. 1) is fixed, relative to the image sensor 104. However, in other embodiments, the vertical (z-axis) location of the target 106 is adjustable. In one embodiment shown in FIG. 12, a motorized worm screw drive 1200 is configured to adjust the height of the target 106, relative to the image sensor 104. The motorized worm screw drive 1200 adjusts the height of the target 106 along an axis parallel to the optical axis 1201 of the image sensor 104. FIGS. 13 and 14 are illustrations of the motorized target motorized worm screw drive1200. FIGS. 15 and 16 are computer-aided design (CAD) drawings of a hand-cranked movable target 106, similar to the motorized target 106 of FIGS. 12-14 except with a hand crank 1500, instead of a motor, according to another embodiment of the present invention.

A motor 1210 drives a lead screw 1215, optionally via a belt 1202 and pulley 1204. A treaded bushing 1212 attached to the target 106 drives the target 106 up or down, depending on the direction in which the lead screw 1215 is turned by the motor 1210. The target 106 rides along guides 1206. The target 106 may be equipped with linear bearings 1208. Optionally, an intermediate optic (relay optic) 1205 may be disposed between the target 106 and the camera sensor 104. The intermediate optic 1205 increases or decreases, as desired, the optical distance between the target 106 and the camera sensor 104.

The motorized target assembly allows for automated adjustment of the optical target distance during an optical lens alignment. The motor 1210 may be controlled by the computer 108 (FIG. 1). A linear encoder 1214 and reader 1216 read vertical position of the target 106. Feedback from the motor 1210 and/or data from the linear encoder 1214 and reader 1216 can be provided to the computer 108 to enable the computer 108 to ascertain the vertical position of the target 106.

The computer 108 may accept inputs from an operator from a control panel 1218 to move the target 106 up or down, such as while the operator depresses a button. Optionally, the computer 108 may accept an input from the operator to move the target 106 to an operator-specified position or distance from the digital camera sensor 104. If an intermediate optic (relay optic) 1205 is disposed between the target 106 and the camera sensor 104, the computer 108 may calculate an effective distance between the target 106 and the camera sensor 104, based on power of the intermediate optic 1205. In such embodiments, the computer 108 may modify the distance specified by the operator, taking into account the intermediate optic 1205, before driving the motor 1210 to move the target 106. In other embodiments, the computer 108 automatically drives the motor 1210 to move the target 106 as part of aligning the lens 102 to the camera sensor 104 or as part of testing an alignment. In FIGS. 13, 15 and 16, only a mounting plate 1300 for the intermediate optic 1205 is shown, i.e., the intermediate optic 1205 is not shown in FIGS. 13, 15 and 16.

The motorized target provides flexibility to optimize focus at different distances depending on the application. It also allows for determination of best focus for a built camera by moving the target 106 to several positions throughout the focus range and recording focus quality (for example modulation transfer function ("MTF")) at each point. A characterization can then be plotted that shows where in space the lens 102 focus in optimized.

The moveable target can move through a range of positions, from negative (virtual distance) to infinity (focal) positive (real distance) and beyond, if necessary, using the optional intermediate lens 1205 (relay optic) and a positioning system, such as a servo motor 1210 with lead screw 1215. Because of the magnification provided by the lens 1205, the target 106 only needs to move a relatively small distance, such as about 80 mm in some embodiments, relative to the stationary lens to achieve the entire range of distances explained above. This not only makes the system compact, but it also allows for fast changes during production, because the moves are very short.

The target and lens sub-system is calibrated using a calibrated optical telescope (collimator) that can provide the full range of distances. Using the collimator as the benchmark, the target positioning relative to the lens can be adjusted such that the characterization for the camera system is correlated.

A bed of nails, spring-loaded test probes ("pogo pins") or another well-known in-circuit test fixture (not shown) is used to temporarily provide electrical power to the sensor 104 and to electrically connect the image sensor 104 to a computer 108 that controls the robot 100. Through the test fixture, the computer 108 receives image data from the image sensor 104 and evaluates image focus quality or another image attribute or set of attributes of the image. In some cases, separate (but interconnected) computers (not shown) control the robot 100 and receive and evaluate the image data. The computer 108, or the portion of the computer 108, that receives and evaluates the image data is referred to herein as a "measurement system." The computer, or the portion of the computer 108, that controls the robot 100, optionally including encoders or other devices used by the computer to measure the location of the robot 100, are collectively referred to herein as a "motion control system."

Figure 3:
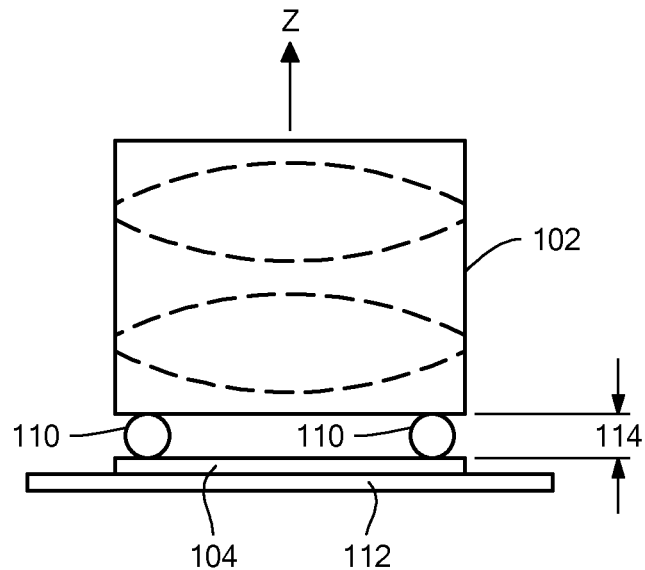
FIG. 3 is a cross-sectional view of a portion of the system of FIG. 1.

Adhesive (here represented by adhesive dots 110, but alternatively an annular or other shape deposition of adhesive) is used to bond the lens 102 to the image sensor 104 or its substrate 112, as more clearly shown in FIG. 3, which is a cross-sectional view of the components of FIG. 1. In a typical example, such as a camera module for a mobile device such as a cell phone, the lens-to-sensor distance 114 is nominally about 150 μm, plus or minus about 50 μm. The adhesive is typically applied before the alignment process begins, although additional adhesive can be applied afterward. For adhesive applied before the alignment process begins, sufficient adhesive is applied to accommodate extremes at which the lens 102 may be positioned and oriented, while still providing sufficient mechanical bonding between the lens 102 and the sensor 104 or substrate 112.

Once a position and an orientation that provide the best image focus quality are found, the robot 100 maintains the lens 102 in place while the adhesive at least partially cures. Most adhesives shrink while they cure. Thus, after determining the lens position and orientation that provide the best focus, some embodiments further adjust the lens position and orientation to compensate for expected adhesive shrinkage. Optionally, an ultraviolet beam and/or heat (not shown) may be applied to the adhesive to accelerate the curing.

Surface Finder

As noted, adhesive may be dispensed to attach the lens 102 to the image sensor 104. The location at which the adhesive is dispensed should be accurately controlled. In particular, the height of a surface of the image sensor 104 on which the adhesive is dispensed needs to be accurately determined. This height may vary from image sensor 104 to image sensor 104 processed by the robot 100.

Finding the location of a surface is an important step in automated processes, for example, the dispensing of adhesive. Manual methods can be tedious. Automated measurement can save time and result in more precise and repeatable measurements and adhesive dispensing. Existing methods typically use expensive sensors or motion systems to probe a surface, and these systems often require additional calibration to maintain performance.

Figure 17:
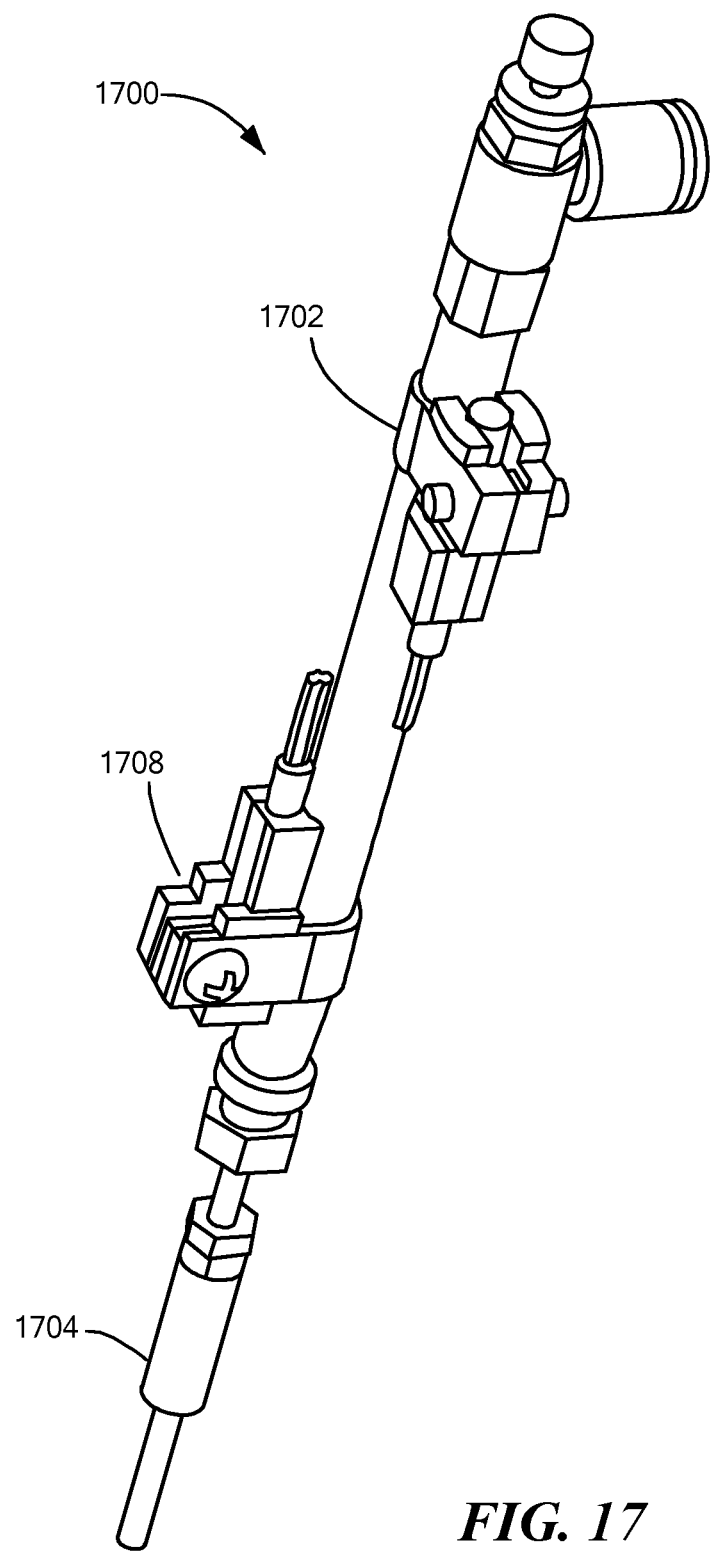
FIG. 17 is a perspective illustration of a surface finder, according to an embodiment of the present invention.
Figure 18:
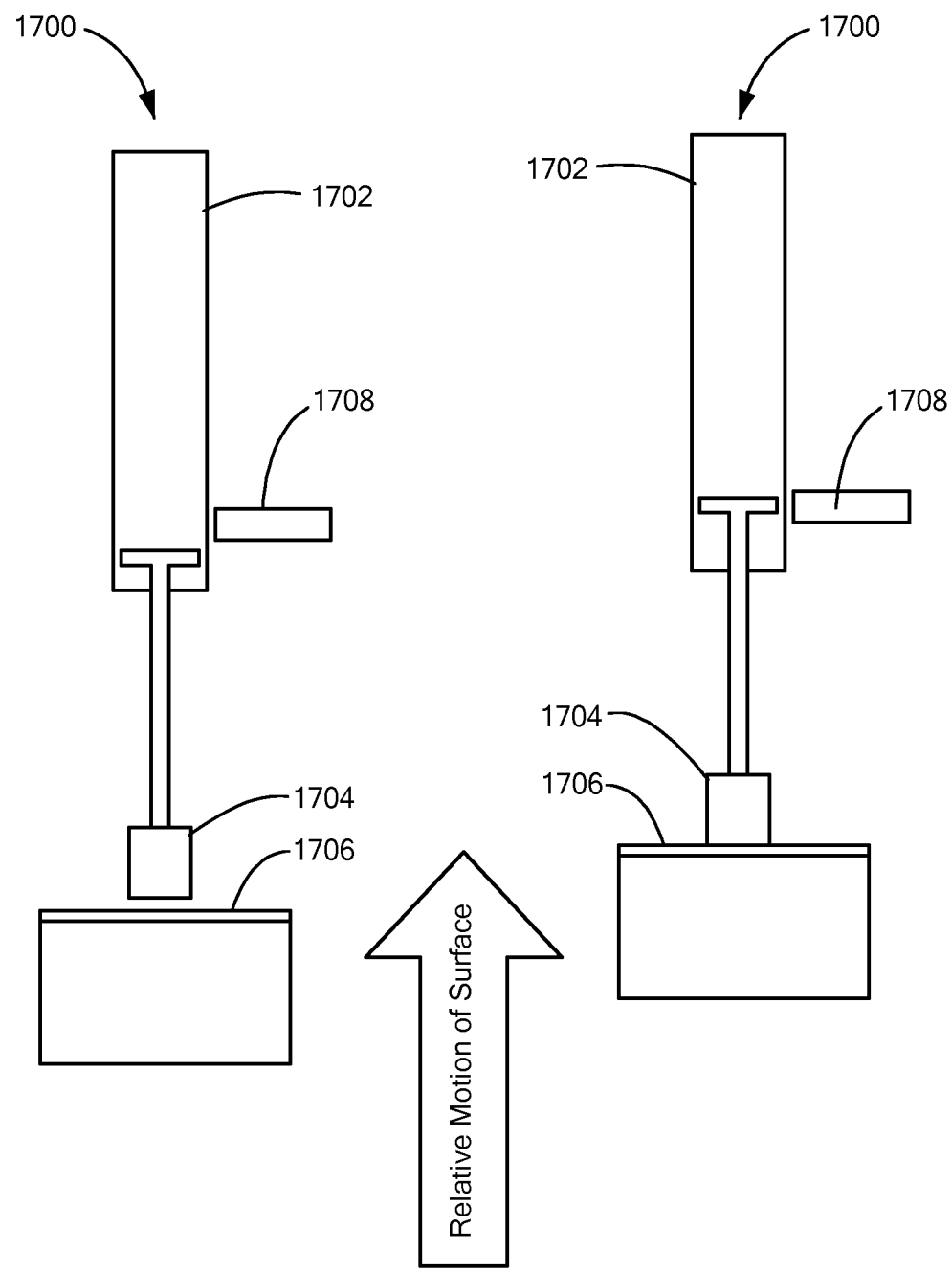
FIG. 18 is a schematic block diagram illustrating operation of the surface finder of FIG. 17.

FIG. 17 is a perspective illustration of a surface finder 1700, according to an embodiment of the present invention, and FIG. 18 is a schematic block diagram illustrating operation of the surface finder 1700. The surface finder 1700 includes a pneumatic pencil cylinder or electric solenoid 1702 that is used in combination with a (primary) motion stage to accurately find the position (for example, the vertical height) of any surface it touches 1706. When not in use, the surface finder 1700 retracts its surface probe 1704 out of the way. This eliminates the need for an additional axis of motion to make this measurement and allows the measurement to be as accurate as the primary stage. When needed, the surface probe 1704 indexes downward to a fully extended position. This fully extended position is confirmed with the use of a proximity sensor 1708. The primary servo stage to which the surface finder 1700 is mounted is then moved towards the target surface 1706 until the tip of the surface probe 1704 touches the surface 1706 to be measured. The surface finder 1700 continues to move in the same direction until the tip of the surface probe 1704 begins to be pushed by the surface it is touching until the extended position sensor 1708 goes OFF. The position at which this sensor 1708 goes from the ON to OFF state is accurate to the repeatability of the proximity sensor 1708. The same function can be achieved by fixing the position of the surface finder 1700 and moving the target surface 1706. Using this method, a tool that moves in unison with the surface finder can be repeatably moved to a predetermined distance above a surface of a workpiece or the surfaces of a series of workpieces.

The surface finder 1700 can be calibrated by measuring the distance travelled by the surface probe before the proximity sensor 1708 changes state. This can be measured using a variety of methods, including feeler gauges, machine vision, force sensor, etc. This surface probe position then needs to be correlated to the tool or process that requires an accurate surface position.

Adhesive Curing Light Calibration

As noted, optionally an ultraviolet (UV), infrared (IR) or other energy beam is applied to the adhesive to accelerate curing the adhesive. In one embodiment illustrated in FIG. 12, a plurality of illumination sources (UV, IR or other), such as UV or IR light-emitting diodes (LEDs), exemplified by LEDs 1250, are arranged around the lens 102 and the image sensor 104, so as to illuminate the adhesive dots 110 with appropriate radiation. The LEDs may be mounted on a ring 150 or any other suitable mounting structure. Of course, the adhesive can be dispensed as a continuous ring or other shape. The ring 150 of illumination sources 1250 may be positionally fixed, or it may be robotically brought into position when needed to cure the adhesive.

If the individual illumination sources 1250 in the ring 150 do not illuminate the adhesive 110 at least approximately equally, the adhesive 110 may cure unevenly or not at all. The illumination sources 1250 in the ring 150 degrade with time, and they may not all degrade at the same rate. Furthermore, one or more of the illumination sources 1250 may become soiled or otherwise contaminated and, therefore, illuminate the adhesive 110 less than other of the illumination sources.

Embodiments of the present invention automatically measure intensity of the illumination reaching the area of the adhesive. (This process is referred to herein as "calibration.") If the measured amount of illumination from one or more of the illumination sources 1250 is outside a predetermined range, some embodiments raise an alarm. Other embodiments automatically compensate for the unequal illumination by increasing or decreasing power, as appropriate, to the errant illumination source 1250 or to the other illumination sources 1250, so as to approximately equalize the illumination reaching the area of the adhesive from each of the illumination sources.

Figure 19:
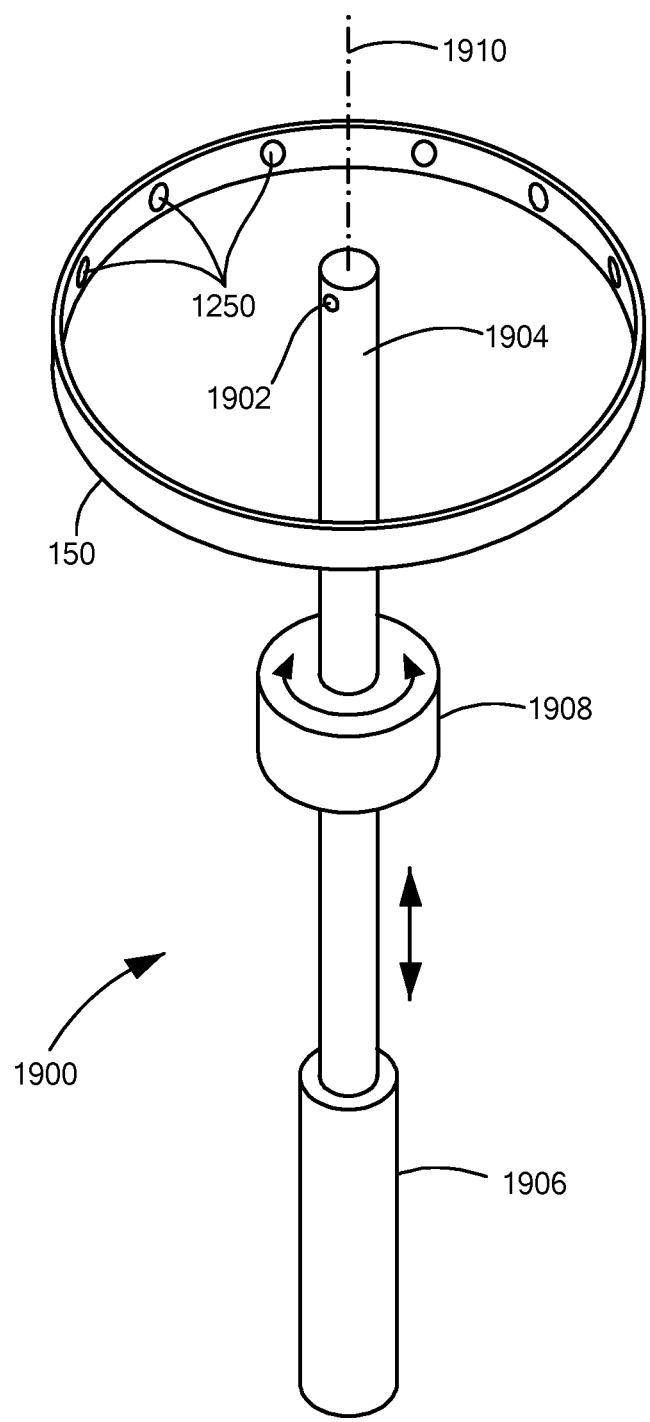
FIG. 19 is a perspective schematic illustration of an illumination calibrator and a movable target, according to embodiments of the present invention.

This calibration allows for completely automated calibration of a multi-point UV delivery head 150 used for glue curing. Because the calibration allows for hands-free calibration, it can be executed during a production cycle, and it is much faster and safer than previous methods. FIG. 19 is a perspective schematic illustration of an illumination calibrator 1900, according to an embodiment of the present invention. The calibration assembly includes a UV sensor 1902 mounted on a rotary stage 1904 driven by a motor (vertical indexer) 1906, such that the vertical position of the motor 1906 can be correlated to the position on the UV curing system 150. In addition, an angular indexer 1908 rotates the rotary stage 1904, and therefore the UV sensor 1902, about an axis 1910 of the illumination calibrator 1900.

When measurement is required, the UV sensor assembly and UV curing delivery head 150 can be moved separately, so that the sensor 1902 is located in a position where it can effectively measure the UV output of an illumination source 1250. The UV head 150 may be positioned such that all UV light sources 1250 are radially approximately equidistant from the UV sensor 1904 for more uniform measurement, but concentric location is not required, as only repeatable positioning of the sensor 1902, relative to the UV head 150, is needed. The calibration can be programmed within the computer 108 to occur automatically based on an elapsed time or number of machine cycles, or it can be executed in a non-production mode at any time. Because the process is automated and can be controlled with closed-loop servos, the calibration is much more repeatable than manual methods.

In response to commands from the computer 108, the UV sensor 1902 rotates to each UV light source 1250 individually. The computer 108 triggers the UV light source 1250 to fire, and the UV sensor 1902 records an intensity or dosage reading. The UV sensor 1902 sends data regarding the intensity or dosage to the computer 108. The computer 108 then rotates the UV sensor 1902 to each subsequent UV light source 1250 sequentially and collects data for each UV light source 1250 individually. The data can be logged to a file, and the computer 108 can compare the readings to threshold values. The computer 108 can halt the production process, if the UV intensity of any UV light source 1250 is above or below a process threshold.

A further benefit of this method is that the intensity is measured at the process area (i.e., at the distal end of the UV path, and at the correct distance from the distal end to the object to be cured), as opposed to measuring output at the lamp housing or using a handheld meter, which does not measure at the correct process distance and requires manual handling (and sometimes removal) of the UV light source. This is highly undesirable due to the time required, and the lack of repeatable positioning of the UV delivery heads when they are re-mounted.

Figure 20:
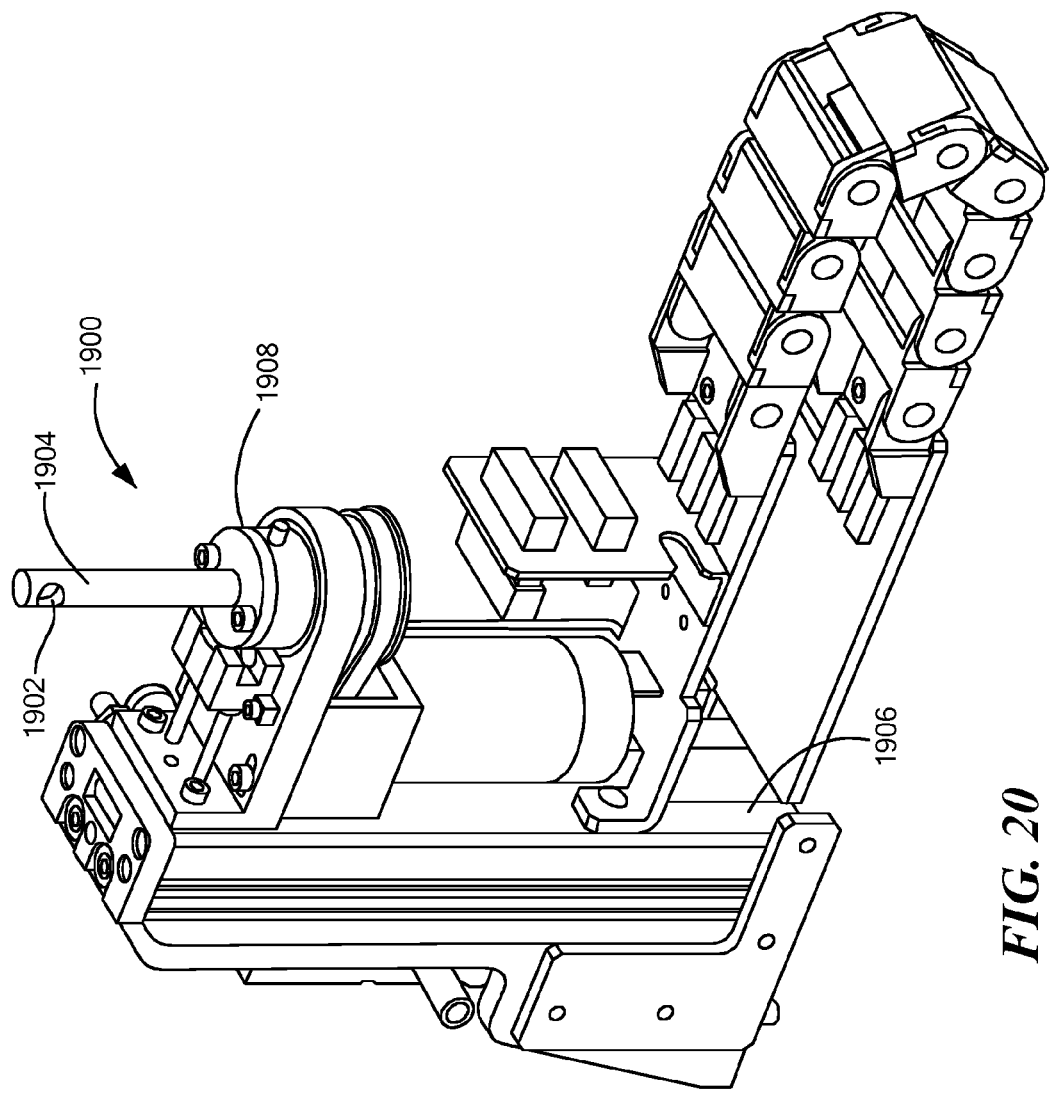
FIG. 20 is a computer-aided design (CAD) drawing of the illumination calibrator of FIG. 19, according to an embodiment of the present invention.
Figure 21:
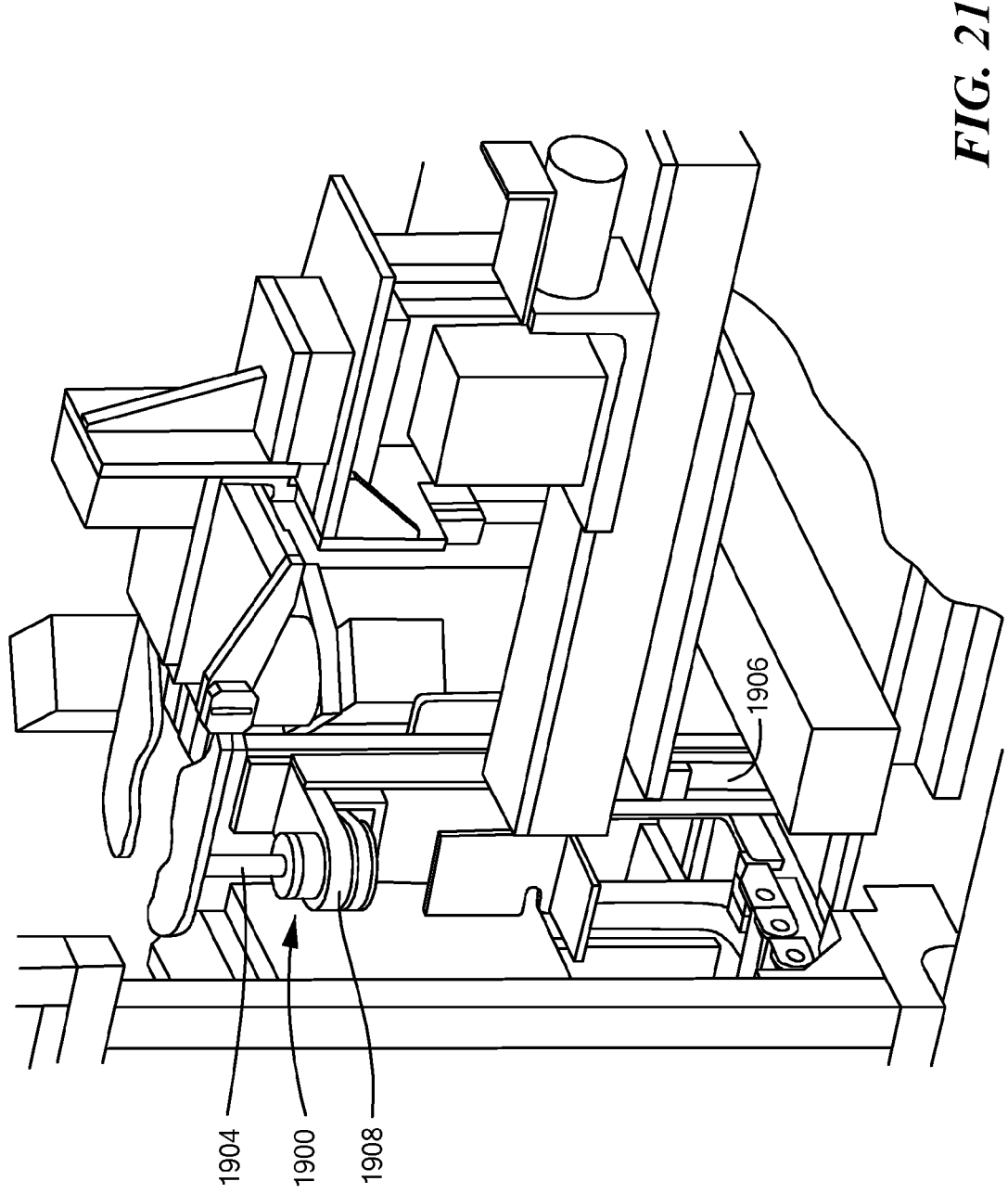
FIG. 21 is a computer-aided design (CAD) drawing of the illumination calibrator of FIGS. 19 and 20, shown in the context of a portion of a robot, according to an embodiment of the present invention.

FIG. 20 is a computer-aided design (CAD) drawing of the illumination calibrator 1900, and FIG. 21 is a computer-aided design (CAD) drawing of the illumination calibrator 1900 shown in the context of a portion of a robot, according to an embodiment of the present invention.

Active Alignment

In these and other alignment examples, finding the best alignment between the lens 102 and the optical sensor 104 can be made methodical, repeatable and automatable by stepping the lens 102 through a series of discrete positions and orientations, possibly along multiple trajectories. The stepping typically begins with a lens-to-image sensor separation greater than expected to yield a well-focused image and continues to a lens-to-image sensor separation less than expected to yield a well-focused image. For example, for a lens 102 that is expected to produce a well-focused image at about 150 μm, the stepping may begin at a lens-to-image sensor separation of about 200 μm, and each step may involve moving the lens about 10 μm, until the lens 102 is within about 50 μm from the image sensor 104, or perhaps closer. At each step, the lens 102 is briefly held in position and a measurement is taken of optical power, beam density, acquired image sensor focus quality or another attribute directly related to the quality of the alignment. Using conventional equipment, one such sweep takes about 4 seconds to complete. Typically, the lens 102 is made to approach the image sensor 104. However, movement of the lens 102 may be in either direction, i.e., toward or away from the image sensor 104.

Figure 4:
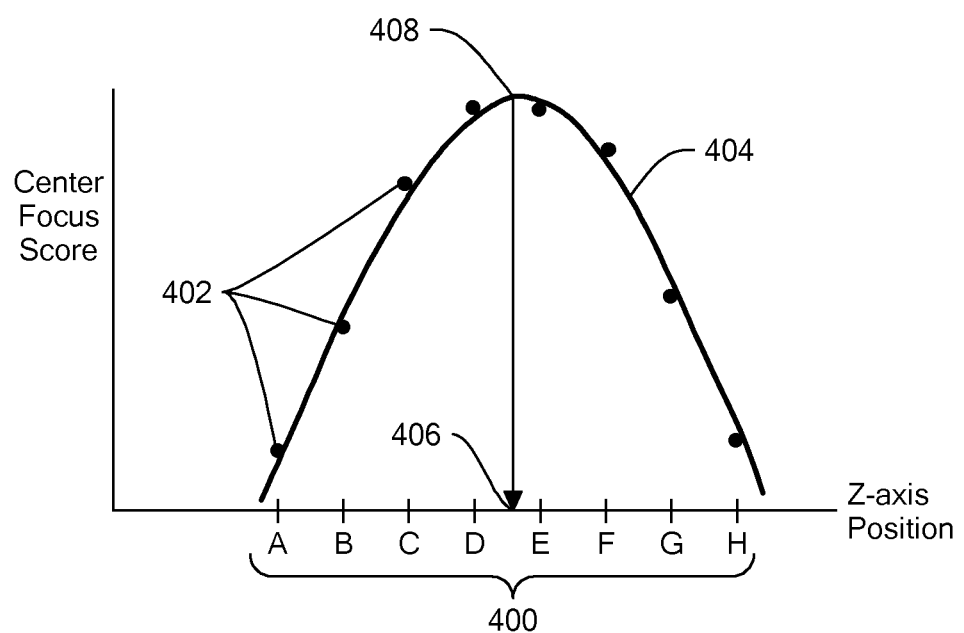
FIG. 4 is a hypothetical graph of center focus score, versus z-axis position of an optical element.

Assume the lens 102 is moved progressively along the z axis to each of several positions A, B, C, D, E, F, G and H represented by tick marks 400 in a graph in FIG. 4, and the computer 108 captures an image and calculates a focus score of the center 202 and four corners 204, 206, 208, and 210 of the of the target 106 at each of these positions A-H. The focus scores may be calculated based on a spatial rate of change or gradient across edge transitions from light to dark or dark to light in a region of interest captured by the camera under test.

Hypothetical center focus scores are indicated by points 402. The computer 108 then calculates a polynomial equation that best fits the points 402. Curve 404 represents a plot of a hypothetical best fit polynomial equation for the points 402. Thus, the curve 404 and the equation describe a relationship between beam or image focus quality and lens position. From the polynomial equation, the computer 108 calculates a z-axis location 406 for the lens 102 that should produce the best center focus score 408, i.e., at a peak in the curve 404. The peak 408 may represent a local maximum of the fitted equation. The computer 108 may then cause the robot to position the lens 102 at the determined best location 406 along the z axis and allow the adhesive to cure.

More sophisticated systems may repeat the tests to improve accuracy. For example, each test may determine a location and/or an orientation that provides an improved focus score over the previous test, and each subsequent test may begin with the lens located and/or oriented according to results of the previous test, so as to iteratively find a position and orientation that provide a good focus score.

As noted, optical elements may not be perfectly mounted within the lens 102. For example, the optical elements may be tilted, with respect to their ideal orientations. Furthermore, the sensor 104 may not be perfectly perpendicular to, or centered on, the z axis. Consequently, the position 406 (FIG. 4) of the lens 102 along the z axis that produces the best center focus score 408 many not necessarily produce best focused corners 204, 206, 208 and 210. Thus, as the lens 102 is stepped along the z axis toward the image sensor 104, one of the corners 204, 206, 208 or 210 of the target 200 may come into best focus before (i.e., at a greater z-axis distance from the sensor 104 than) the center 202 of the target 200. Similarly, the other corners 204, 206, 208 and/or 210 may come into best focus at other locations of the lens 102 along the z axis.

Figure 5:
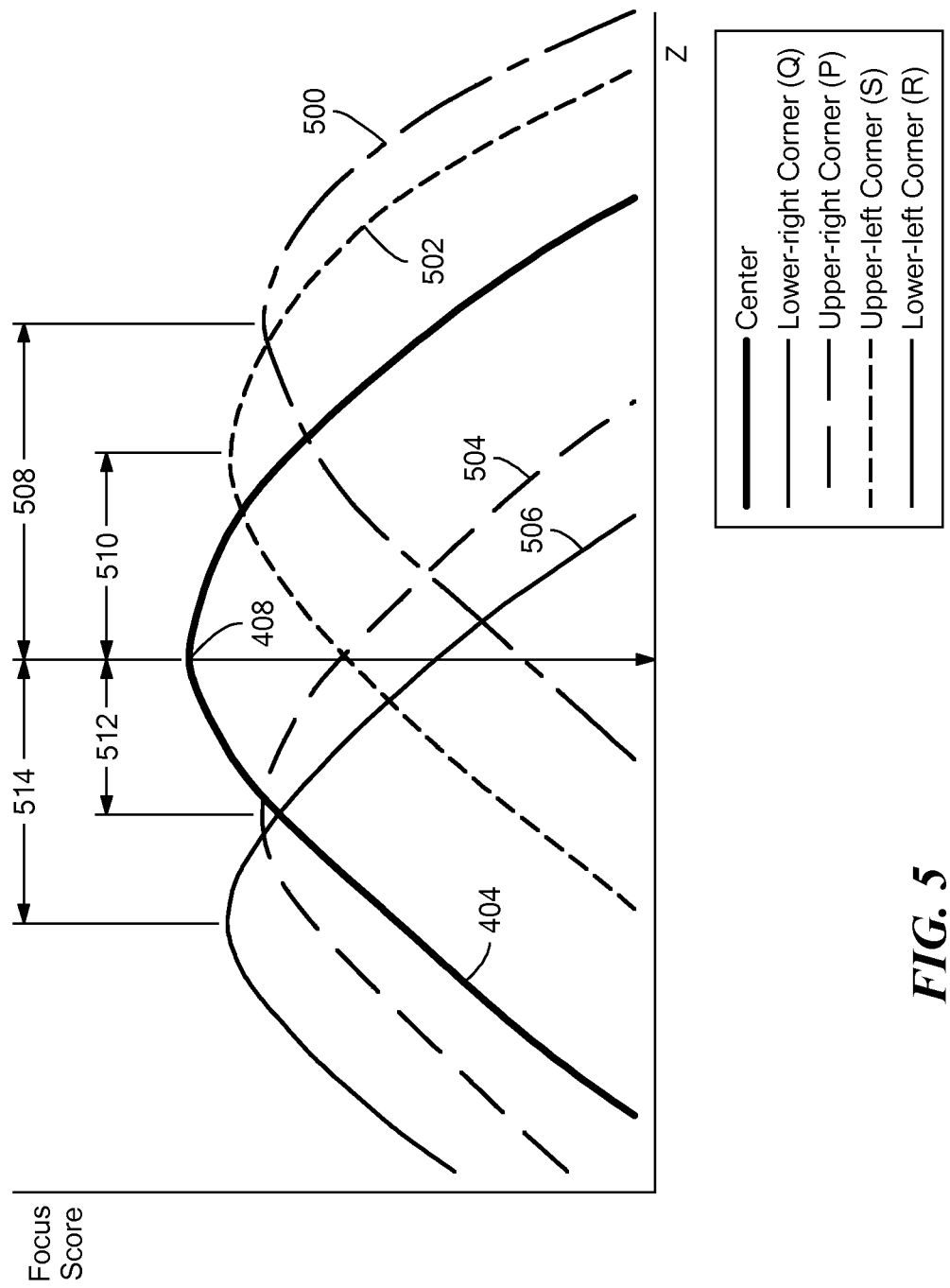
FIG. 5 is a hypothetical graph of center and four corner focus scores, versus z-axis position of an unaligned optical element.

As the robot 100 steps the lens 102 through the positions A-H (400, FIG. 4) along the z axis, the computer 108 also analyzes portions of the sensor image data representing the corners 204, 206, 208 and 210 of the target 200 and fits polynomial curves for each of the four corners. FIG. 5 depicts a hypothetical set of curves 500, 502, 504 and 506 representing polynomial equation fits of focus scores for the four corners 204, 206, 208 and 210. In this hypothetical example, the lower-right corner 206, represented by focus score curve 506, is best focused at a smaller z-axis (lens-to-sensor) distance than the center 202 of the target 200 or any of the other three corners 204, 208 or 210. Similarly, the lower-left corner 208, represented by focus score curve 500, is best focused at a larger z-axis lens-to-sensor distance than the center 208 or any of the other three corners 204, 206 or 210. Note that the shapes and heights of the center and of the four corner focus score curves 408, 500, 502, 504 and 506 may not necessarily be identical, due to imperfections, such as asymmetries, in the lens 102.

From the polynomial equations corresponding to the curves 500, 502, 504 and 506, the computer 108 determines pitch and roll angles (θx and θy) for the lens 102 that optimize focus of the corners 204, 206, 208 and 210. A respective distance 508, 510, 512 and 514 between each peak in the corner focus score curves 500, 502, 504 and 506 and the peak of the center focus score curve 404 is proportional to an amount by which the respective portion of the lens 102 is pitched or rolled, relative to ideal, and, therefore, the amount of pitch or roll motion required to compensate for the lens imperfection. The amount of pitch or roll required also depends on the distance 212 between the center 202 of the target 200 and the high-contrast feature 204, 206, 208 or 210 used to calculate the focus score. The further the high-contrast feature 204, 206, 208 or 210 is from the center 202 of the target 200, the more pitch or roll is required to correct for a given displacement 508, 510, 512 or 514 of the peak in the focus score from the peak 408 in the center focus score.

Corner focus score curves (exemplified in this hypothetical case by curves 504 and 506) whose peaks are to the left of the center focus score curve 404 correspond to corners 204 and 206 (in this case upper-right and lower-right corners) that are in best focus when the lens 102 is closer to the image sensor 104 than when the center 202 of the target 200 is in best focus. Therefore, the lens 102 should be pitched an/d or rolled, so as to increase the distances between the lens 102 and the portions of the image sensor 104 that image these corners 204 and 206.

Similarly, corner focus score curves (exemplified by curves 500 and 502) whose peaks are to the right of the center focus score curve 404 correspond to corners 208 and 210 (in this case upper-left and lower-left corners) that are in best focus when the lens 102 is further from the image sensor 104 than when the center 202 of the target 200 is in best focus. Therefore, the lens 102 should be pitched and/or rolled, so as to decrease the distances between the lens 102 and the portions of the image sensor 104 that image these corners 208 and 210.

Figure 6:
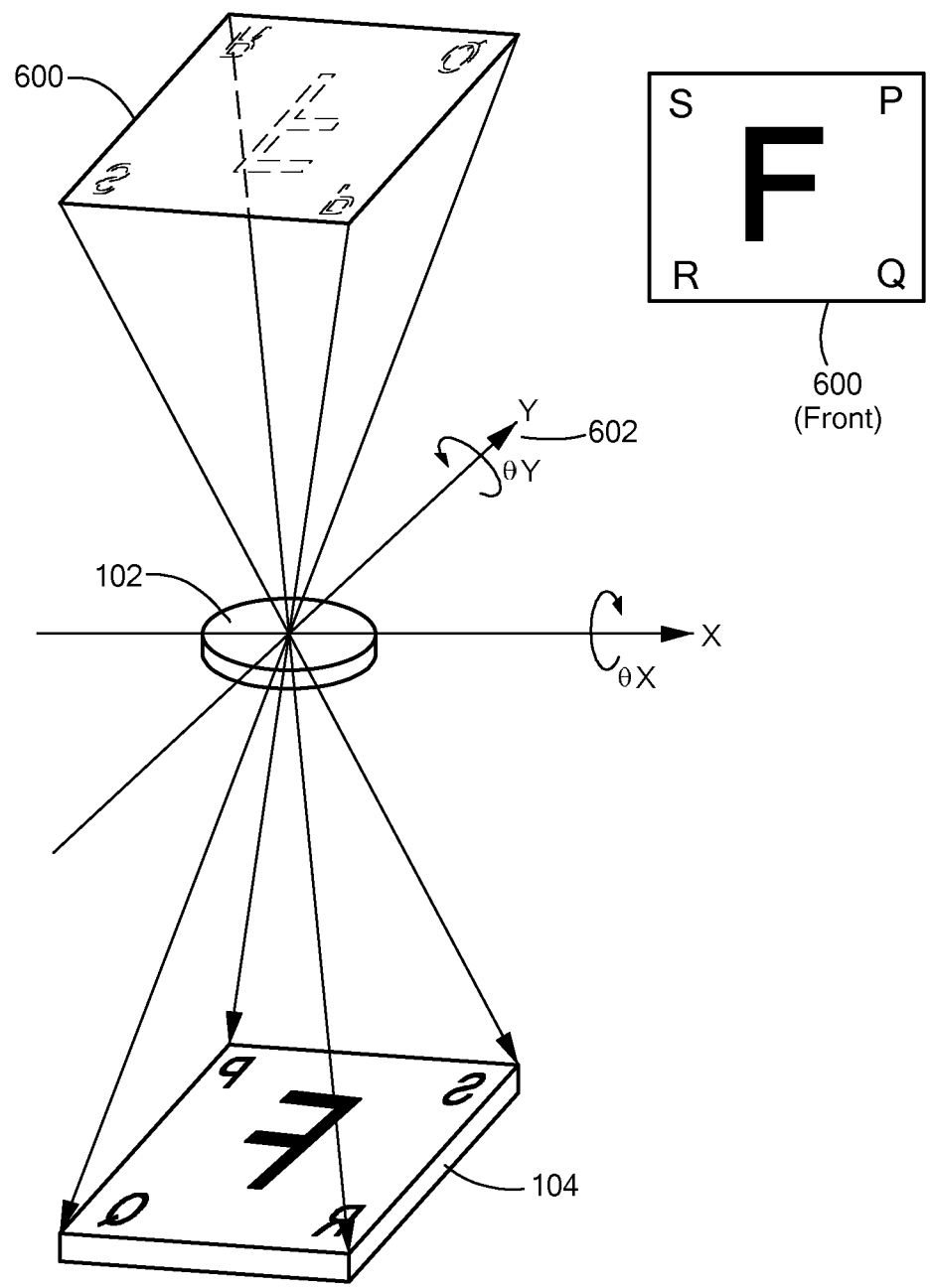
FIG. 6 is a perspective schematic illustration of a target, lens and image sensor, as well as possible rotations of the lens about two axes.

As shown schematically in FIG. 6 (using a different target 600 for clarity, but maintaining assumptions about lens imperfections made above), rolling the lens 102 about the y axis would simultaneously bring the lens 102 closer to, or further from, the portion of the image sensor 104 that images the upper-right corner P and the lower-right corner Q of the target 600, depending on which way (clockwise or counterclockwise) the lens 102 is rolled about the y axis. Such rolling would also bring the lens 102 further from, or close to, the portion of the image sensor 104 that images the lower-left corner R and the upper-left corner S, but in an opposite sense to that of corners P and Q. Thus, rolling the lens 102 in a negative direction (i.e., opposite the arrow 602) about the y axis moves the focus score curves 504 and 506 to the right, and it moves the focus score curves 500 and 502 to the left.

Similarly, pitching the lens 102 about the x axis would simultaneously bring the lens 102 closer to, or further from, the portion of the image sensor 104 that images the lower-left corner R and the lower-right corner Q and, in an opposite sense, bring the lens 102 further from, or closer to, the portion of the image sensor 104 that images the upper-left corner S and the upper-right corner P, depending on which way (clockwise or counterclockwise) the lens 102 is pitched about the x axis.

Collectively, pitching and rolling the lens 102 as just described brings all the focus score curves 500, 502, 504 and 506 closer together.

As noted, the distances 508, 510, 512 and 514 (FIG. 5) indicate the relative amounts by which the lens 102 should be pitched or rolled to compensate for the mis-focused corners. The greater the distance 212 (FIG. 2) between the center 202 and any corner (ex., 206) of the target 200, the less the lens 102 needs to be tipped or tilted, for a given distance 508-514 between the peak 408 of the center focus score curve and a peak in the corner focus score curve 500-506.

Figure 7:
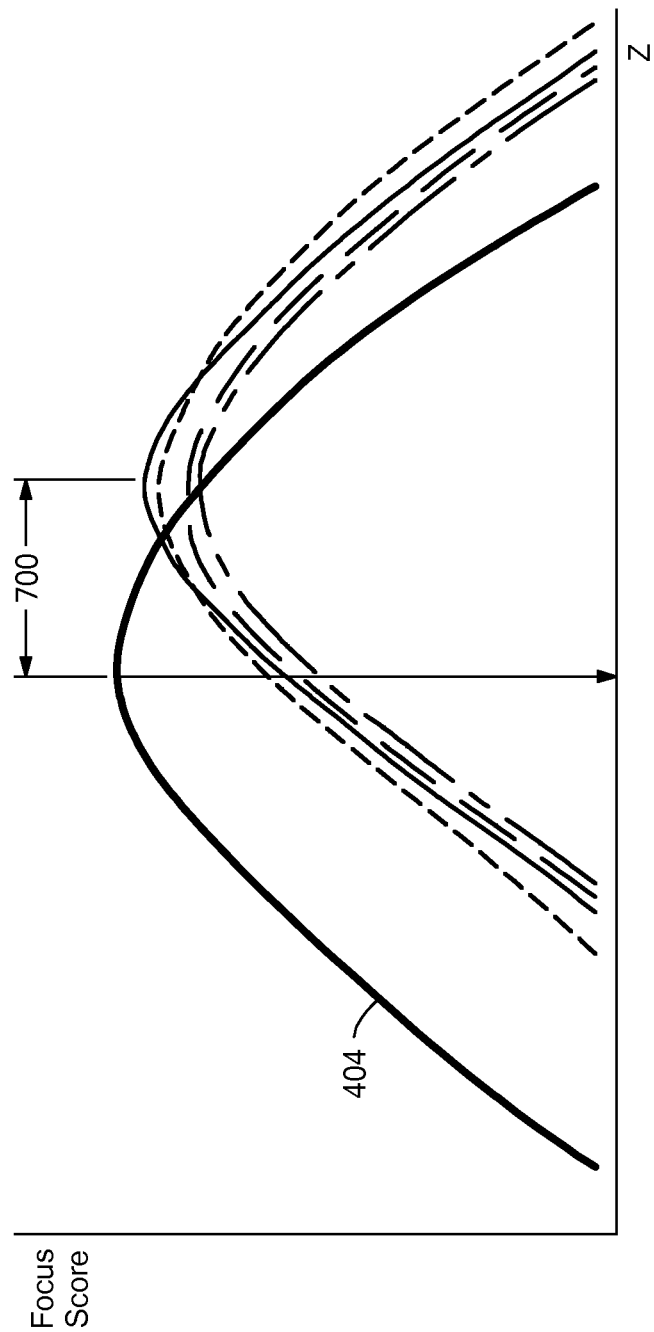
FIG. 7 is a hypothetical graph of center and four corner focus scores, versus z-axis position, similar to the graph of FIG. 6, except for an aligned optical element.

Thus, the pitch and roll of the lens 102 may be adjusted (i.e., two degrees of freedom are available), by which the computer 108 can adjust the lens 102 so that all four corner focus scores peak at the same, or nearly the same, z-axis location, as represented in a hypothetical plot shown in FIG. 7. Plane geometry may be used to calculate the amount by which the lens 102 should be pitched and/or rolled, based on the distances 508-514. Depending on imperfections in the lens, it may not be possible to find a single orientation (i.e., a θx and a θy) that simultaneously maximizes all four corner focus scores. Furthermore, it may not be possible to simultaneously maximize the four corner focus scores and the center focus score. As shown in FIG. 7, the center focus score 404 may peak at z-axis distance 700 from the peak corner focus scores, after the lens 102 orientation has been adjusted.

The computer 108 may, therefore, weight the four corner focus scores and the center focus score to determine a best compromise of positions along, and orientations about, the axes of motion. The weightings (center to corners) may be selected based on needs for a particular camera assembly. In some embodiments, the center focus score to corner focus score weighting ratio may be 50/50, 60/40, 75/25, 100/0 or any other suitable weighting ratio. Using a weighting ratio of 100/0 optimizes for the center focus score, and it makes the four corner focus score curve peaks coincident (or nearly so), although, as shown in FIG. 7, the corner focus curves may peak at a different z-axis location than the center focus score peaks.

The computer 108 (FIG. 1) may iteratively perform the above-described procedure. For example, in a first pass, the computer 108 may determine a pitch and roll of the lens 102 that provides an acceptable balance among the four corner focus scores and between the center focus score and the corner focus scores collectively, as described above. Then, in a second pass, the motion control system may cause the robot 100 to tip and tilt the lens 102 according to results of the first pass and perform the above-described procedure again. Optionally, additional iterative passes may be performed.

Thus far, the movement path (trajectory) of the lens 102 under test has been described as being linear or angular (ex., pitch or roll about an axis). However, other 1-, 2- or more dimensional trajectories may be used. Exemplary trajectories include linear, helical, spiral and box.

Figure 8:
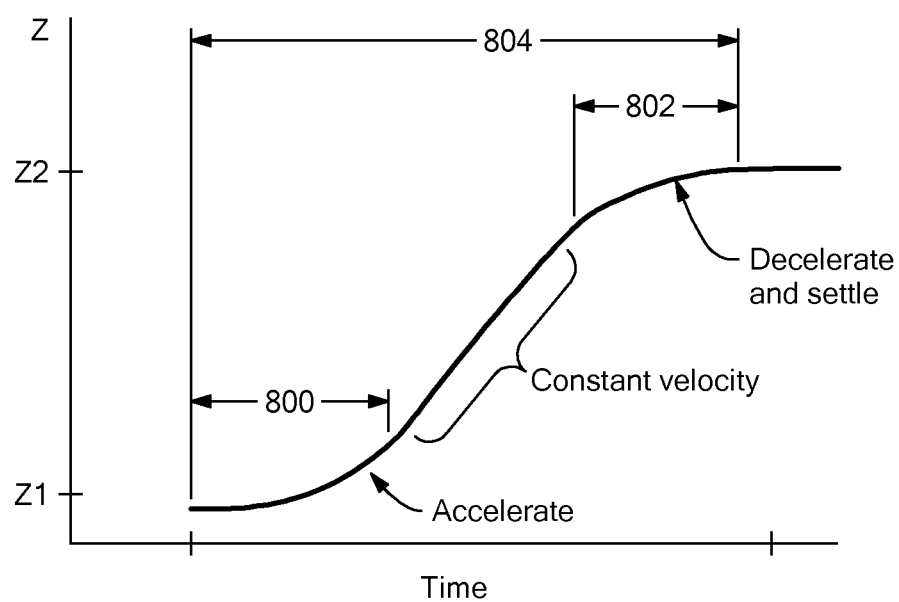
FIG. 8 is a hypothetical graph illustrating positions of an optical element as it is transitioned between adjacent positions in a stepped scan, according to the prior art.

Although the above-described procedure can yield an acceptable position and orientation for a lens, the procedure is relatively slow, because the robot must stop at each test position and orientation while an image or other measurement is captured. FIG. 8 is a hypothetical graph of displacement along the z axis plotted against time for a transition between two adjacent test positions Z1 and Z2. After an image has been captured by the computer 108 while the lens 102 in at location Z1, the computer 108 causes the robot 100 to move the lens 102 to location Z2. Being a mechanical system with mass and inertia, the movement involves a period 800 of acceleration to a slew rate, followed by a period 802 of deceleration and settling. If the system is less than critically damped, the lens position may ring (not shown) until it settles sufficiently.

For most effective and efficient active alignment of objects during manufacturing and test applications, it is important to be able to implement alignment as quickly as possible. This allows the number of units that can be assembled and tested in a given time period to be higher. Thus, implementing the most efficient and fastest scans of positions and orientations to find best focus alignment is ideal. Various methods are used to decrease the amount of time required to align objects. These methods include scanning along various trajectories, such as line scans, box scans and spiral scans. By definition, a "scan" is a sequence of positions and/or orientations along a trajectory, where focus quality or another alignment quality metric is measured for each position and/or orientation. The measurements may be performed while the robot is stopped at each position and/or orientation, or image data collected during a scan may be stored in a memory and then analyzed later, such as during the remainder of the scan or after the scan has been completed. Regardless of when the image data is analyzed (i.e., while the robot is in a position where the image data is captured or after the robot has moved beyond that position), we refer to measurements of alignment quality for the positions and/or orientations where the image data was captured. In a "stepped scan," the lens or other object to be aligned is sequentially moved to each position and/or orientation of a set of positions and/or orientations. At each position and/or orientation at which a measurement is to be taken, the motion is stopped, and then the image data is captured.

One method for reducing time required for a scan is to not stop at each measurement position and/or orientation along its trajectory. Instead, the lens or other object is moved continuously (i.e., without stopping) along the trajectory, and image data are captured at each measurement position and/or orientation, while the robot is in motion. This is called a "continuous scan." As long as measurement accuracy is not significantly diminished by taking measurements while moving the lens or other object, a continuous scan can significantly reduce the time taken to execute the alignment scan. For example, much of the acceleration time 800 and the deceleration and settling time 802 may be saved. In some embodiments, a continuous scan can save about 35-50% of the cycle time 804 required to step between successive positions and/or orientations of a stepped scan.

A challenge in implementing a continuous scan is to record the position and/or orientation of the object being aligned at the same time as measurement data is acquired. This is particularly difficult if the instrument or system that performs the data collection or the alignment quality measurements is implemented with a different set of hardware or a different software control system than is used to control the continuous scan motion and record the locus of positions and orientations corresponding of the object.

Some embodiments of the present invention synchronize the measurements taken or information collection with the positions and orientations for each measurement point during a continuous scan using an electrical signal input to the motion control system that correlates to each measurement point. In one such system, which aligns a lens to an image sensor, the image sensor circuit generates a video synchronization signal each time an image is generated. The synchronization signal is fed to the motion control system and, in response to the synchronization signal, the motion control system records the position and/or orientation of the lens when each image is captured.

Video synchronization pulses are typically generated by video image sensors, such as sensors used in backup cameras. However, sensors and related circuitry used in other contexts, such as still digital cameras, typically do not generate video synchronization signals, which makes the above-described alignment process unsuitable for these sensors. Some embodiments of the present invention solve this problem by synthesizing a synchronization signal when an image is captured, as described in more detail below. Other embodiments of the present invention do not require a synchronization signal.

Figure 9:
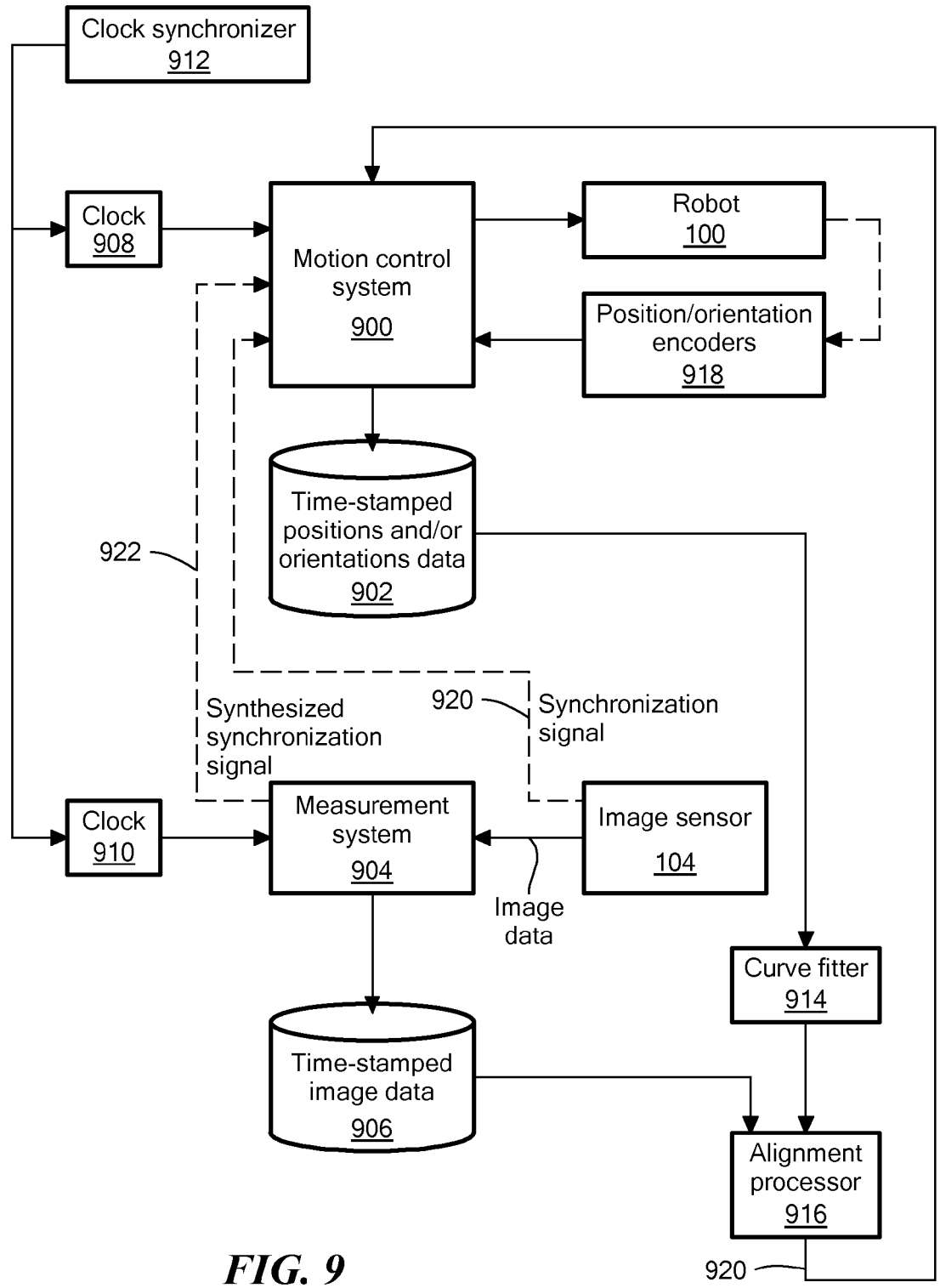
FIG. 9 is a schematic block diagram of an embodiment of the present invention.

One embodiment of the present invention is shown schematically in FIG. 9. During a continuous scan, at each of several times (preferably, but not necessarily, at regular time intervals), a motion control system 900 records the time and the position and/or orientation of the lens 102 (or the position and/or orientation of the robot 100, from which the position and/or orientation of the lens 102 can be determined). These time-stamped positions and/or orientations are stored in a memory 902. In parallel, a measurement system 904 records image data and the time at which each image data sample is acquired. These time-stamped image data are stored in a memory 906.

The motion control system 900 and the measurement system 904 may use a single (common) clock (not shown). However, if the motion control system 900 and the measurement system 904 utilize separate clocks 908 and 910, prior to these two parallel operations (motion and measurement), the time clocks 908 and 910 are synchronized, or before, during or after the two parallel operations are performed, an offset between the two clocks is determined and stored, by a clock synchronizer 912. Note that the rate or times at which the position and/or orientation data are recorded may be different than the rate or times at which the image data are acquired. Furthermore, the number of position and/or orientation data items recorded may be different than the number of images recorded. These differences may be a result of using separate clocks 908 and 910 and/or they may be a result of a difference in programming of the motion control system 900 and the measurement system 904.

If each image is acquired at the same time as a position and/or orientation is recorded, an alignment processor 916 can perform the calculations and command the motion control system 900, as described above, to align the lens 102. However, in most cases, recording a position and/or an orientation at the same time as each image is acquired in not possible, impractical, inconvenient or undesired. In these cases, after the scan is performed, a curve fitter 914 fits a linear or other equation to the time-stamped position and/or orientation values 902.

Figure 10:
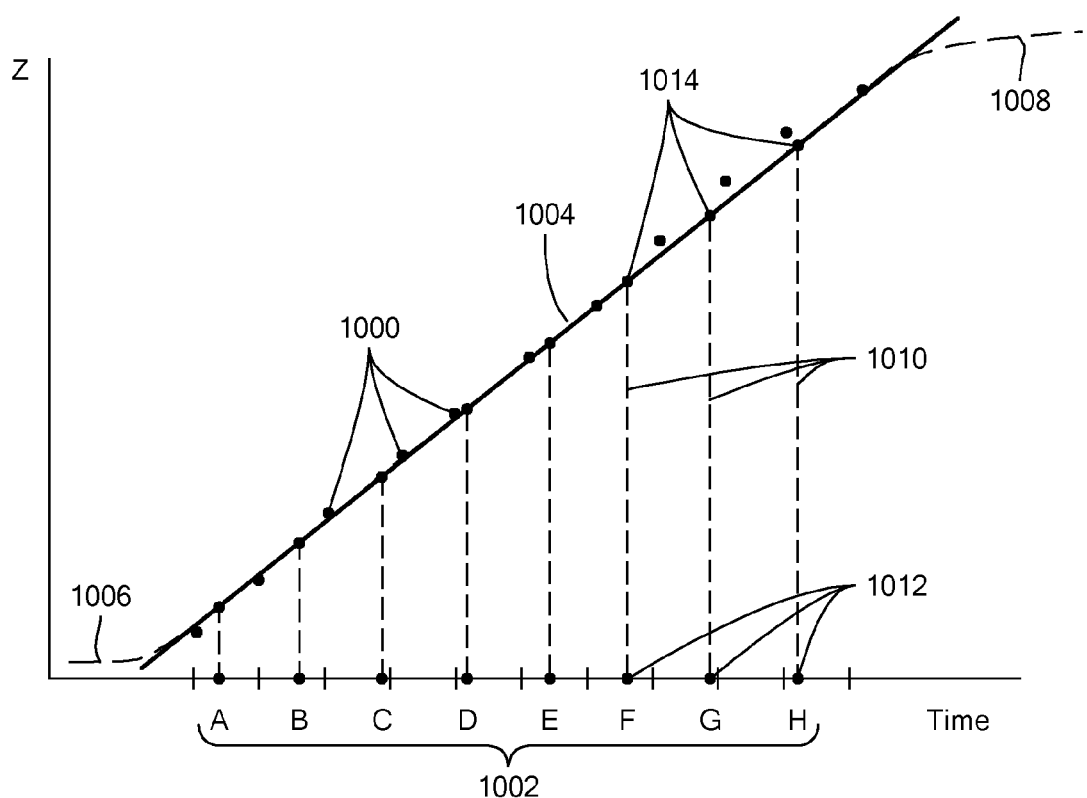
FIG. 10 is a hypothetical graph illustrating curve fitting to calculate a relationship between position of a scanned optical element and time, according to an embodiment of the present invention.

FIG. 10 is a graph showing a hypothetical set of time-stamped points 1000, representing positions along the z axis, as recorded by the motion control system 900 at several times, represented by tick marks 1002. FIG. 10 also shows a hypothetical curve 1004 (corresponding to the fitted equation) fitted to the points 1000.

Note that if the motion control system 900 begins recording the position and/or orientation data after the robot reaches a slew rate, and it ceases recording the data before the robot begins decelerating (as represented in FIG. 10), the acceleration 1006 and deceleration 1008 of the robot 100 is not likely to be represented by the curve 1004, and a linear curve is more likely to be fitted to the points 1000 than if the acceleration 1006 and deceleration 1008 data were recorded and used for the curve fitting. To avoid having to fit non-linear equations, it is recommended that the position and/or orientation data and the image data be collected only while the robot 100 is traveling at its slew rate. However, operation outside the slew rate portion of FIG. 10 is possible, with appropriate adjustments to the equation fitting. In particular, a higher-order, non-linear equation should be used.

The start position or orientation of a scan should be selected such that the robot 100 has a chance to accelerate and reach its slew rate before it reaches the first position and/or orientation of interest in any given test. Similarly, the end position or orientation of the scan should be selected such that the robot 100 reaches the last position and/or orientation of interest in the test, before the robot 100 begins to decelerate.

The equation fitted to the points 1000 can then be used to estimate positions and/or orientations that correspond to any time during the scan and, in particular, to the time stamps recorded for the image data 906. For example, assume eight images were recorded during the scan represented in FIG. 10, each image having been recorded at a time A, B, C, D, E, F, G and H (1012) corresponding to a dashed vertical line 1010. The alignment processor 916 uses these times A-H (1012) and the fitted equation to estimate positions and/or orientations 1014 of the lens 102 at the times the images were acquired. The term "estimate" is used here, because the fitted equation and curve 1004 represent an estimate of a relationship (a "motion profile") between time and the position and/or orientation of the lens 102 during a scan. The estimate may be perfect; nevertheless, it is referred to herein as an estimate.

Errors in the estimate may be caused by several factors, including: clock imprecision or rounding, inaccuracies in encoders 918 used to measure the position and/or orientations of the robot 100 and variations in the speed with which the robot 100 moves during the slew portion of the scan. Even if the time stamps assigned to the recorded positions and/or orientations 902 or the time stamps assigned to the recorded image data 906 include inaccuracies, using multiple data points 1000 for the positions and/or orientations, and using multiple data points 402 (FIG. 4) for the image data, acts to average out the effects of these inaccuracies.

As used herein, the term "estimate" includes calculate. One or more calculations may be performed to arrive at an estimate. As used herein, the terms "fitting an equation" and "fitting a curve" may include estimating. Curve fitting is a well-known process of constructing a curve or a mathematical function that has a best fit to a series of data points, possibly subject to constraints. Curve fitting can involve interpolation, where an exact fit to the data is required, or smoothing, in which a "smoothing" function is constructed that approximately fits the data. Curve or equation fitting may involve polynomial equations, possibly including logarithmic or exponential functions.

The alignment processor 916 (FIG. 9) implements the alignment process described above, using the estimated positions and/or orientations of the lens and focus scores it calculates from the image data. For example, the eight times A-H (1012) in FIG. 10 may correspond to the eight tick marks A-H (400) in FIG. 4, which represent the locations along the z axis at which images are captured and focus scores are calculated. The alignment processor 916 sends commands (via connection 920) to the motion control system 900 to drive the test procedure scans (to position and orient the robot 100) and to finally position the lens while the adhesive cures.

In embodiments where the image sensor 104 generates a synchronization signal whenever it captures an image, the synchronization signal may be provided to the motion control system 900, as shown by dashed line 920, and the motion control system 900 may store the position and/or orientation of the lens 102 (or the position and/or orientation of the robot 100, from which the position and/or orientation of the lens 102 can be determined) in response to the synchronization signal.

In some embodiments where the image sensor 104 does not generate synchronization signals, the measurement system 904 may synthesize a synchronization signal whenever the measurement system 904 acquires an image data sample, and this synthesized synchronization signal may be provided to the motion control system 900, as shown by dashed line 922. As described above, the motion control system 900 may store the position and/or orientation of the lens 102 (or the position and/or orientation of the robot 100, from which the position and/or orientation of the lens 102 can be determined) in response to the synthesized synchronization signal.

Figure 11A:
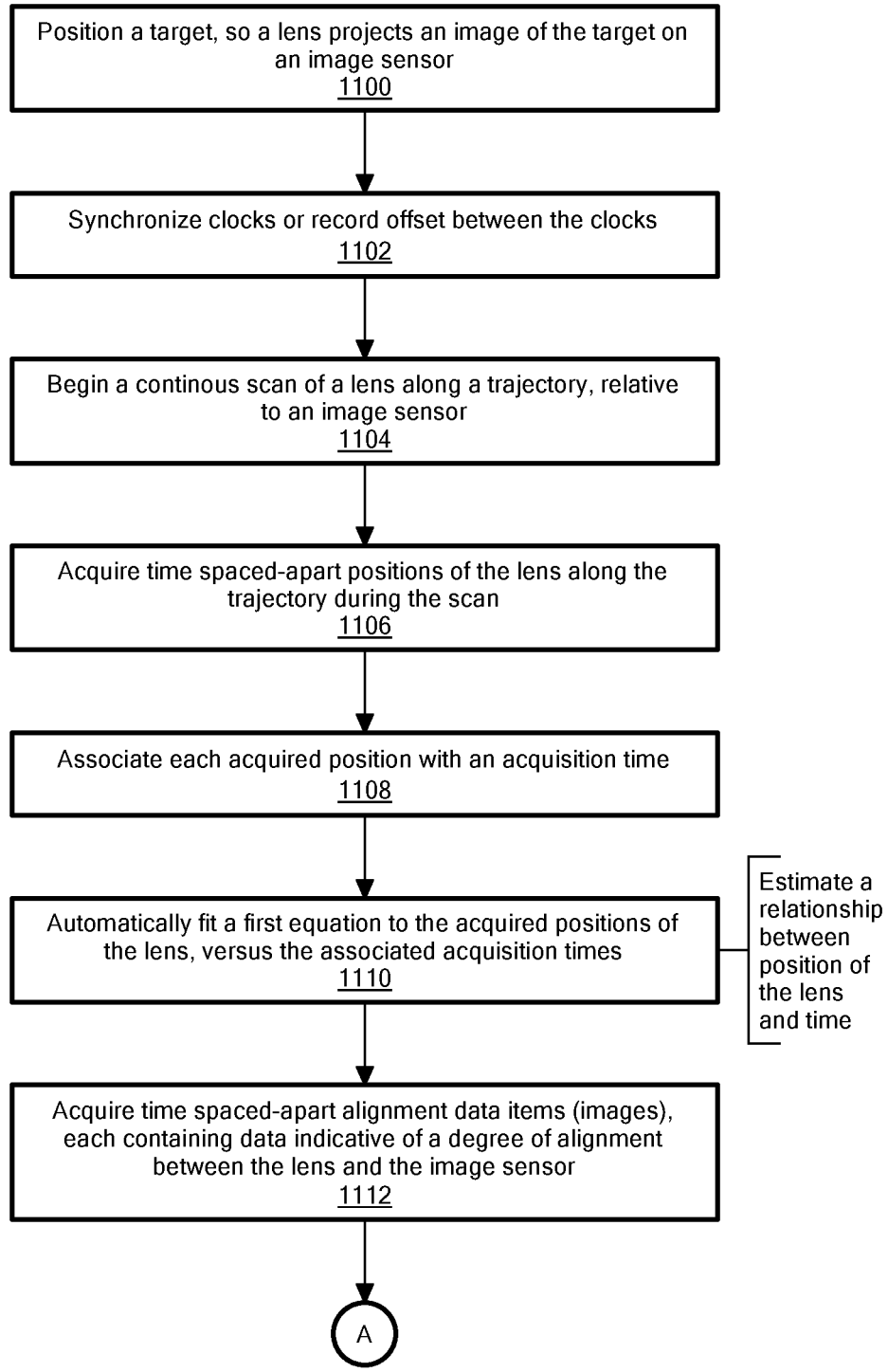
FIGS. 11A and 11B contain a schematic flowchart illustrating operations performed by an embodiment of the present invention.
Figure 11B:
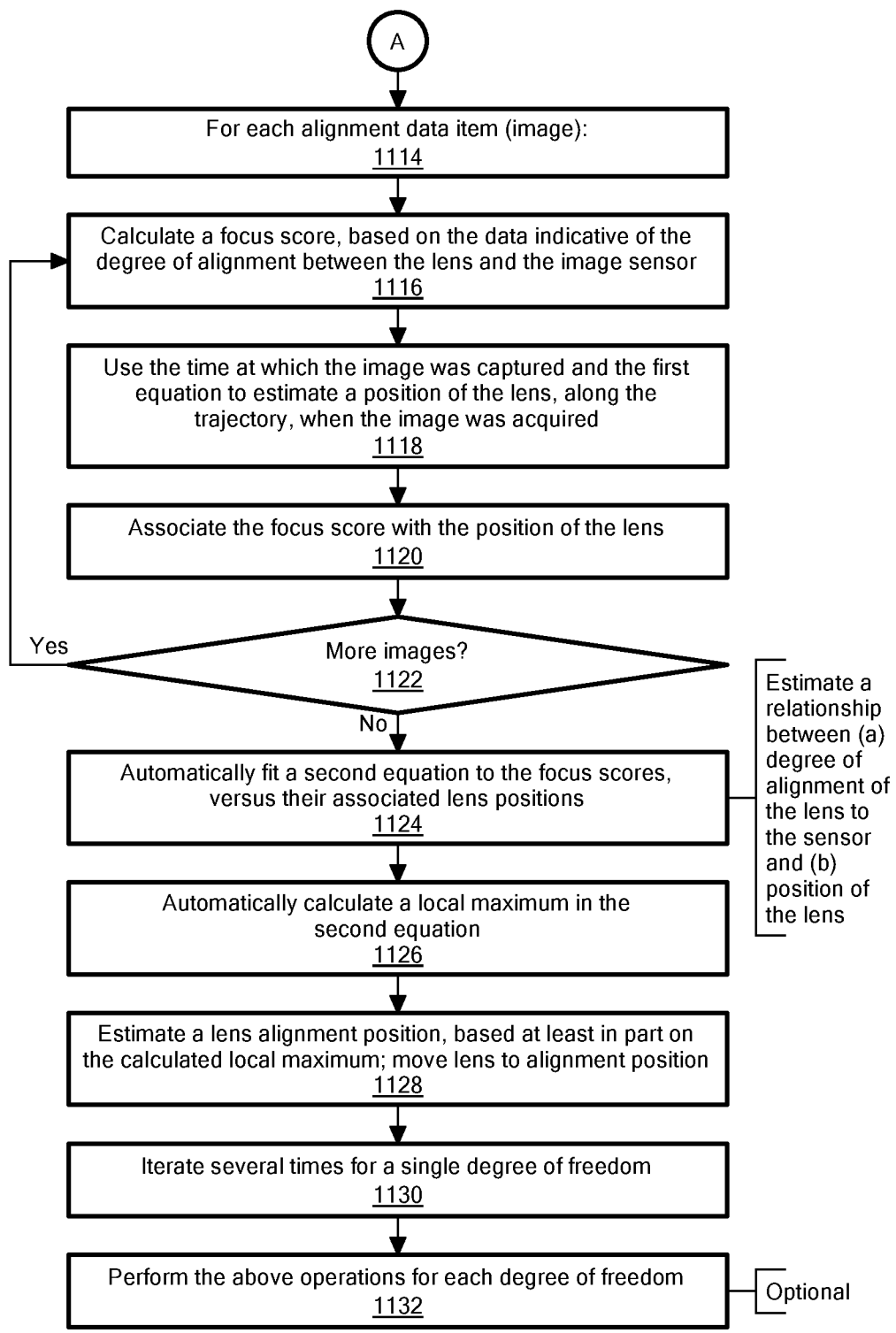

FIGS. 11A and 11B contain a flowchart illustrating operation of an embodiment of the present invention. At 1100, the target 106 is positioned, so the lens 102 projects an image of the target 106 on the image sensor 104. At 1102, if the motion control system 900 (FIG. 9) and the measurement system 904 utilize separate clocks 908 and 910, the two clocks 908 and 910 are synchronized or an offset between the two clocks is recorded, so times recorded by the motion control system 900 can be correlated to times recorded by the measurement system 904.

At 1104, a continuous scan begins. The robot 100 scans the lens 102 along the z axis or along another axis or along a complex path that involves several axes. While the robot 100 scans the lens 102, at 1106 the motion control system 900 (FIG. 9) acquires data from the encoders 918. The data indicates where the lens (or the robot) is positioned or oriented, along the trajectory. Several measurements of position or orientation of the lens 102 are taken as the robot 100 moves the lens 102, thereby yielding a plurality of time spaced-apart positions of the lens 102. (For simplicity of explanation, the term "position" is sometimes used to mean position and/or orientation.)

The time at which each of the positions or orientations is measured is also recorded from a clock, such as the clock 908 (FIG. 9). At 1108, a position measurement is associated with the time at which the measurement was taken. At 1110, the curve fitter 914 automatically fits a first equation to the measured positions of the lens 102, versus the times at which the measurements were taken. The equation represents an estimated relationship between position of the lens and time during the scan.

While the robot 100 (FIG. 1) scans the lens 102 and the motion control system 900 (FIG. 9) acquires the data indicating where the lens (or the robot) is positioned or oriented along the trajectory, at 1112, the measurement system 904 acquires a series of time spaced-apart images (alignment data items) from the image sensor 104. Each image can be analyzed for focus quality or another metric indicating how well the lens 102 is aligned with the image sensor 104. Thus, each image contains data indicative of a degree of optical alignment between the lens 102 and the image sensor 104. The alignment data items should be acquired during a portion of the scan that at least partially overlaps with a portion of the scan during which the lens positions are acquired 1106. However, non-overlapping portions of the scan may be used for acquiring the alignment data items 1112 and the lens positions 1106.

At 1114, the measurement system 904 begins a loop that executes once for each image acquired. Within the loop, at 1116, the measurement system 904 calculates a focus score or other value that indicates a degree of optical alignment of between the lens 102 and the image sensor 104. As noted, this value may be an image intensity gradient, a contrast value across portions of the target 200, a simple intensity or any other suitable value. At 1118, the measurement system 904 uses the times at which the images were acquired and the first equation, which represents the relationship between lens position and time, to calculate the positions of the lens 102 at the times the images were acquired. At 1120, the focus score is associated with its respective lens position. If there are more images, at 1122, the loop returns to 1116, otherwise control passes to 1124.

At 1124, a second equation is fitted to the focus scores, versus the associated lens positions (at times when the images were acquired). This second equation represents an estimated relationship between: (a) a degree of optical alignment of the lens to the sensor (such as the focus score), and (b) position of the lens. The alignment processor 916 then calculates a local maximum of the second equation. This local maximum provides an estimate of a good alignment position for the lens 102. As noted, this alignment position may be modified, such as to compensate for expected shrinkage of adhesive. Nevertheless, the result is referred to herein as the estimated alignment position. The robot then moves the lens 102 to the estimated alignment position.

As noted, at 1130, the operations described above may be iterated to improve accuracy of the estimated alignment position within one degree of freedom, such as along the z axis or rotation about the y axis. At 1132, these operations may be performed for each of the degrees of freedom, if needed. Although the flow chart indicates all operations for a single degree of freedom may be completed at 1130 before any operations are performed at 1132 for another degree of freedom, this need not necessarily be the case. In other words, iterations for a single degree of freedom may be intermixed with alignment procedures for other degrees of freedom.

The times at which the positions and/or orientations of the lens 102 are recorded, or alternatively the time intervals between successive recordations, may be preprogrammed, automatically determined or user-configurable. For example, the motion control system 900 (FIG. 9) may automatically determine an appropriate time interval, based on a desired number of points to fit the equation and the total range of distance or orientation (angle) to be tested and the rate at which the robot 100 moves or rotates. In other words, the time interval may be automatically selected such that the desired number of points are recorded in the time it takes the robot to travel or rotate the total range of distance or orientation, taking into account acceleration and deceleration times. As noted, the time intervals between which the motion control system 900 (FIG. 9) records successive positions and/or orientations of the lens 102 may, but need not, be regular. Similarly, the time intervals between which the measurement system 904 acquires successive images from the image sensor 104 may, but need not, be regular. Thus, as used herein, the term "time spaced-apart" does not necessarily mean at regular time intervals.

Using a continuous scan allows a system to take more image and/or position and/or orientation sample points per unit of time than a stepped scan would permit. These additional points may be used to improve accuracy of the curve fitting described above, without negatively impacting the time taken to perform an individual scan. Optionally or alternatively, the time saving (over a stepped scan) can be used to shorten the overall alignment procedure or to perform one or more additional iterations.

The image sensor 104 may be fabricated according to various technologies, such as charge-coupled device (CCD) or complementary metal-oxide-semiconductor (CMOS). In addition, the image sensor 104 output may conform to various standards, such as VGA, NT SC, PAL, SMIA, MIPI or HiSPI.

As used herein, the term "lens" means an object with one or more conventional optical elements. Although the descriptions above are generally presented in the context of aligning a lens to an image sensor, the methods and apparatus described herein are equally applicable to aligning other optical elements (such as optical fibers) to other passive optical elements (such as other optical fibers) or to other optical sensors (such as photodiodes) or to optical sources (such as light emitting diodes (LEDs) and lasers). Collectively, all such lenses, image sensors, optical fibers, photodiodes, LEDs, lasers and the like are referred to in the claims as "optical elements." Although alignment of one optical element, such as a lens, to another optical element, such as an image sensor, has been described, the methods and apparatus described herein may be used as described, with appropriate modifications, to align more than one optical element, such as several optical fibers, with a single optical element, such as an optical sensor or an optical source. Furthermore, the aligned optical elements may, but need not, all be mounted on a common substrate, such as a printed circuit board, integrated circuit board or integrated circuit substrate.

As used herein and in the claims, a "processor" may be: a single processor; a multi-processor, such as a multi-core processor or multiple processors interconnected with each other on a single or multiple integrated circuit substrate or on a single or multiple circuit boards; a single computer or multiple interconnected computers. Although some claims recite performing one or more operations "by a processor," it should be understood that: each operation may be performed by a distinct processor; all the operations may be performed by a single processor; any combination of the operations may be performed by any combination of plural processors; performance of a single operation may be distributed over a plurality of the processors; and these and other combinations are within the scope of the claims.

As used in the claims, the term "position of an optical element" means at least one of: a position of the optical element and an orientation of the optical element. That is, the term "position" means position and/or orientation. As used herein, the term "automatic" or "automatically" means performed without human intervention, although a human may initiate the performance. For example, automatically fitting an equation to a set of data requires a processor to determine parameters of the equation, without assistance from a human.

While the invention is described through the above-described exemplary embodiments, modifications to, and variations of, the illustrated embodiments may be made without departing from the inventive concepts disclosed herein. Furthermore, disclosed aspects, or portions of these aspects, may be combined in ways not listed above and/or not explicitly claimed. Accordingly, the invention should not be viewed as being limited to the disclosed embodiments.

The motion control system 900, data store 902, measurement system 904, data store 906, curve fitter 914, alignment processor 916, clocks 908 and 910, clock synchronizer 912 and other components and processes described herein can be implemented with software, hardware or a combination thereof. These functions can be performed by a processor executing instructions stored in a memory.

Although aspects of embodiments may have been described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on non-transitory tangible non-writable storage media (e.g., read-only memory devices within a computer, such as ROM, or devices readable by a computer I/O attachment, such as CD-ROM or DVD disks), information alterably stored on non-transitory tangible writable storage media (e.g., floppy disks, removable flash memory and hard drives) or information conveyed to a computer through a communication medium, including wired or wireless computer networks. Moreover, while embodiments may be described in connection with various illustrative data structures, the system may be embodied using a variety of data structures.

What is claimed is:

1. A system for actively testing a digital camera having a lens, the system comprising:
   a target having optically contrasting features;
   a robot configured to grasp the digital camera and orient the digital camera before the target, so as to image the target features by the digital camera;
   a drive assembly mechanically coupled to the target to move the target, thereby selectively adjusting spacing between the target and the digital camera;
   a measurement controller configured to acquire a plurality of time spaced-apart alignment data items, wherein each alignment data item of the plurality of time spaced-apart alignment data items:
      results from an optical signal, from the target features, that passed through the lens and was received by the digital camera; and contains data indicative of a degree of optical performance of the digital camera in capturing an image of the target features.

2. The system according to claim 1, further comprising a motion controller configured to:
cause the robot to scan the digital camera along a trajectory from a starting location to an ending location; and
while the robot scans the digital camera from the starting location to the ending location, store a plurality of time spaced-apart positions of the digital camera.

3. The system according to claim 2, further comprising an alignment processor configured to estimate a focus score of the digital camera, based at least in part on the plurality of time spaced-apart alignment data items and the plurality of time spaced-apart positions of the digital camera.

4. The system according to claim 1, wherein the drive assembly comprises a hand crank.

5. The system according to claim 1, wherein the drive assembly comprises a motor.

6. The system according to claim 5, wherein the measurement controller is configured to control operation of the motor.

7. The system according to claim 1, further comprising an encoder and a corresponding reader configured to encode position of the target.

8. The system according to claim 7, wherein the measurement controller is configured to receive, from the reader, information about the position of the target.

9. The system according to claim 1, further comprising a powered relay optical element disposed intermediate the target and the digital camera.

10. A system for actively aligning a lens to an image sensor of a digital camera, the system comprising:
a target having optically contrasting features;
a robot configured to grasp the image sensor and orient the image sensor such that the lens is intermediate the target and the digital camera, so as to image the target features onto the digital camera;
a drive assembly mechanically coupled to the target to move the target, thereby selectively adjusting spacing between the target and the image sensor;
a motion controller configured to:
cause the robot to scan the image sensor along a trajectory from a starting location to an ending location; and
while the robot scans the image sensor from the starting location to the ending location, store a plurality of time spaced-apart positions of the image sensor;
a measurement controller configured, while the robot scans the image sensor from the starting location to the ending location, to:
acquire a plurality of time spaced-apart alignment data items, wherein each alignment data item of the plurality of time spaced-apart alignment data items:
results from an optical signal, from the target features, that passed through the lens and was received by the image sensor; and
contains data indicative of a degree of optical performance of a combination of the lens and the image sensor in capturing an image of the target features; and
an alignment processor configured to:
estimate a desired alignment position, based at least in part on the plurality of time spaced-apart alignment data items and the plurality of time spaced-apart positions of the image sensor; and
cause the robot to move the image sensor to the desired alignment position.

11. The system according to claim 10, wherein the drive assembly comprises a hand crank.

12. The system according to claim 10, wherein the drive assembly comprises a motor.

13. The system according to claim 12, wherein the measurement controller is configured to control operation of the motor.

14. The system according to claim 10, further comprising an encoder and a corresponding reader configured to encode position of the target.

15. The system according to claim 14, wherein the measurement controller is configured to receive, from the reader, information about the position of the target.

16. The system according to claim 10, further comprising a powered relay optical element disposed intermediate the target and the lens.

17. A system for aligning a lens to a digital image sensor, the system comprising:
a robot configured to grasp the image sensor;
an active alignment controller configured to: cause the robot to scan the image sensor along a trajectory, relative to the lens; acquire a plurality of time spaced-apart alignment data items along the trajectory; based on the alignment data items, estimate a desired alignment position for the image sensor; and cause the robot to move the image sensor to the desired alignment position;
a light source radiating light of a wavelength selected to facilitate curing an adhesive to bond the lens to the image sensor in the desired alignment position; and
a curing light calibrator comprising: a light sensor sensitive to the selected wavelength and a first indexer configured to position the light sensor, in one mode, proximate the light source and, in another mode, distant from the light source; wherein:
the active alignment controller is further configured to receive data from the light sensor indicating intensity of the light source.

18. The system according to claim 17, wherein:
the image sensor has an optical axis; and
the indexer is configured to translate the light sensor along an axis parallel to the optical axis of the image sensor.

19. The system according to claim 18, wherein the indexer is configured to rotate the light sensor about an axis parallel to the optical axis of the image sensor.

20. The system according to claim 17, wherein:
the light source comprises a plurality of radially spaced-apart light sources; and
the curing light calibrator comprises a second indexer configured to rotate the light sensor so as to selectively aim the light sensor at each of the plurality of radially spaced-apart light sources individually.

21. The system according to claim 17, further comprising a processor configured to automatically operate the curing light calibrator at intervals based on a number of image sensors processed by the active alignment controller.

22. The system according to claim 17, further comprising a processor configured to receive the data from the light sensor and, when the data from the light sensor indicates intensity of the light source is below a predetermined value, automatically halt production of the active alignment controller.

* * * * *